United States Patent
Kurosawa

(10) Patent No.: US 10,906,245 B2
(45) Date of Patent: Feb. 2, 2021

(54) SHAPED OBJECT, SHAPING SYSTEM, AND PRODUCTION METHOD FOR SHAPED OBJECT

(71) Applicant: CASIO COMPUTER CO., LTD., Tokyo (JP)

(72) Inventor: Satoshi Kurosawa, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 8 days.

(21) Appl. No.: 16/052,837

(22) Filed: Aug. 2, 2018

(65) Prior Publication Data

US 2019/0047223 A1 Feb. 14, 2019

(30) Foreign Application Priority Data

Aug. 9, 2017 (JP) .................................. 2017-154421

(51) Int. Cl.
| | | |
|---|---|---|
| *B29C 64/264* | (2017.01) | |
| *B29C 64/112* | (2017.01) | |
| *B33Y 10/00* | (2015.01) | |
| *B33Y 70/00* | (2020.01) | |
| *B33Y 30/00* | (2015.01) | |
| *B33Y 80/00* | (2015.01) | |

(52) U.S. Cl.
CPC .......... *B29C 64/264* (2017.08); *B29C 64/112* (2017.08); *B33Y 10/00* (2014.12); *B33Y 30/00* (2014.12); *B33Y 70/00* (2014.12); *B33Y 80/00* (2014.12); *B29K 2995/0012* (2013.01); *B29K 2995/0021* (2013.01)

(58) Field of Classification Search
CPC ..... B29C 64/264; B29C 64/112; B33Y 10/00; B33Y 30/00; B33Y 70/00; B33Y 80/00; B29K 2995/0012; B29K 2995/0021
See application file for complete search history.

(56) References Cited

U.S. PATENT DOCUMENTS

2013/0161874 A1   6/2013   Horiuchi

FOREIGN PATENT DOCUMENTS

| JP | S64-028660 A | 1/1989 |
|---|---|---|
| JP | H10-329297 A | 12/1998 |
| JP | 2001-150812 A | 6/2001 |
| JP | 2005-229189 A | 8/2005 |

(Continued)

OTHER PUBLICATIONS

Notification of Reasons for Refusal dated Oct. 1, 2019 in Japanese Patent Application No. JP 2017-154421 together with an English language translation.

*Primary Examiner* — Robert S Walters, Jr.
(74) *Attorney, Agent, or Firm* — Scully Scott Murphy & Presser

(57) ABSTRACT

A shaped object includes a first shaped portion expressing a three-dimensional shape of an object in a first state by at least one bump on the surface of a first thermally expansive section that expands due to being heated, and second shaped portion expressing a three-dimensional shape of the object in a second state by at least one bump on the surface of a second thermally expansive section that expands due to being heated. The second state is a state in which the object is more deteriorated than in the first state. The height of the at least one bump on the surface of the second thermally expansive section at least partially differs from a height of the at least one bump on the surface of the first thermally expansive section.

10 Claims, 10 Drawing Sheets

(56) References Cited

FOREIGN PATENT DOCUMENTS

| JP | 2013-132765 A | 7/2013 |
| JP | 2013-189004 A | 9/2013 |
| JP | 2016-161398 A | 9/2016 |

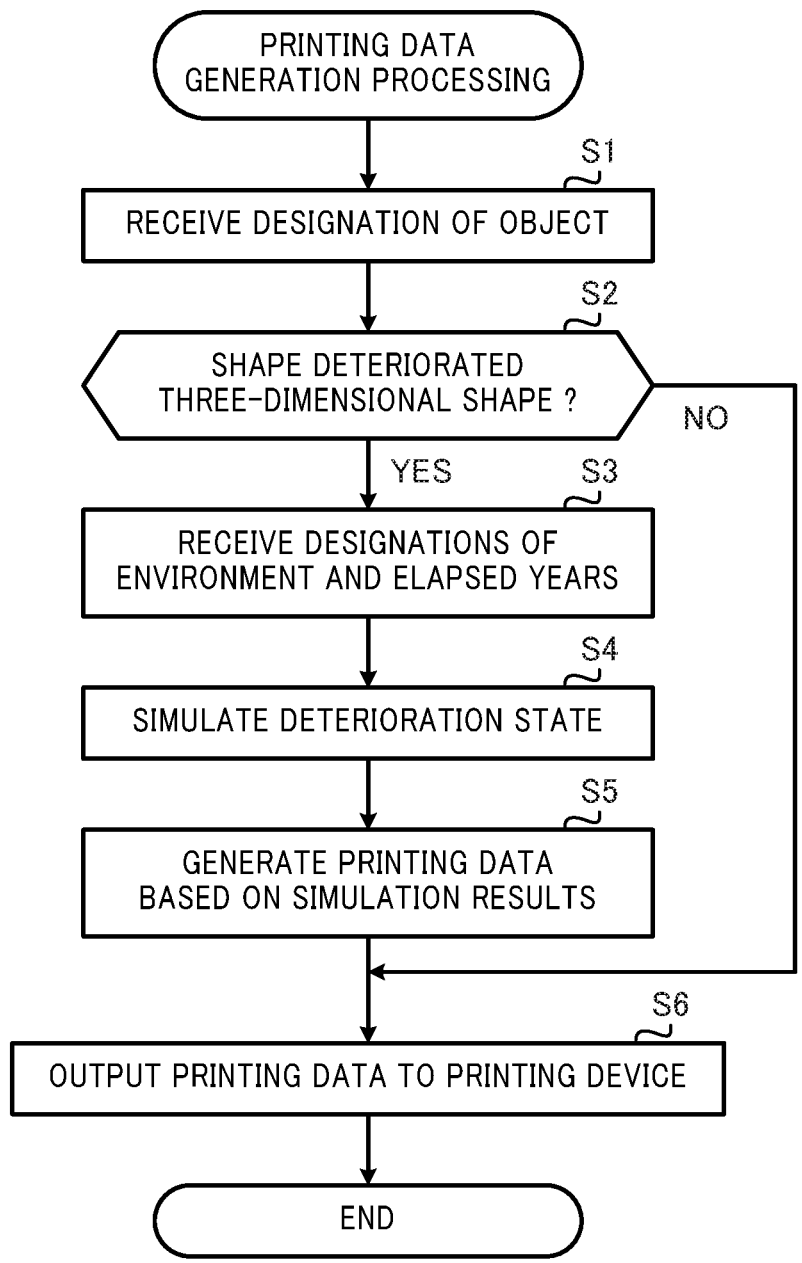

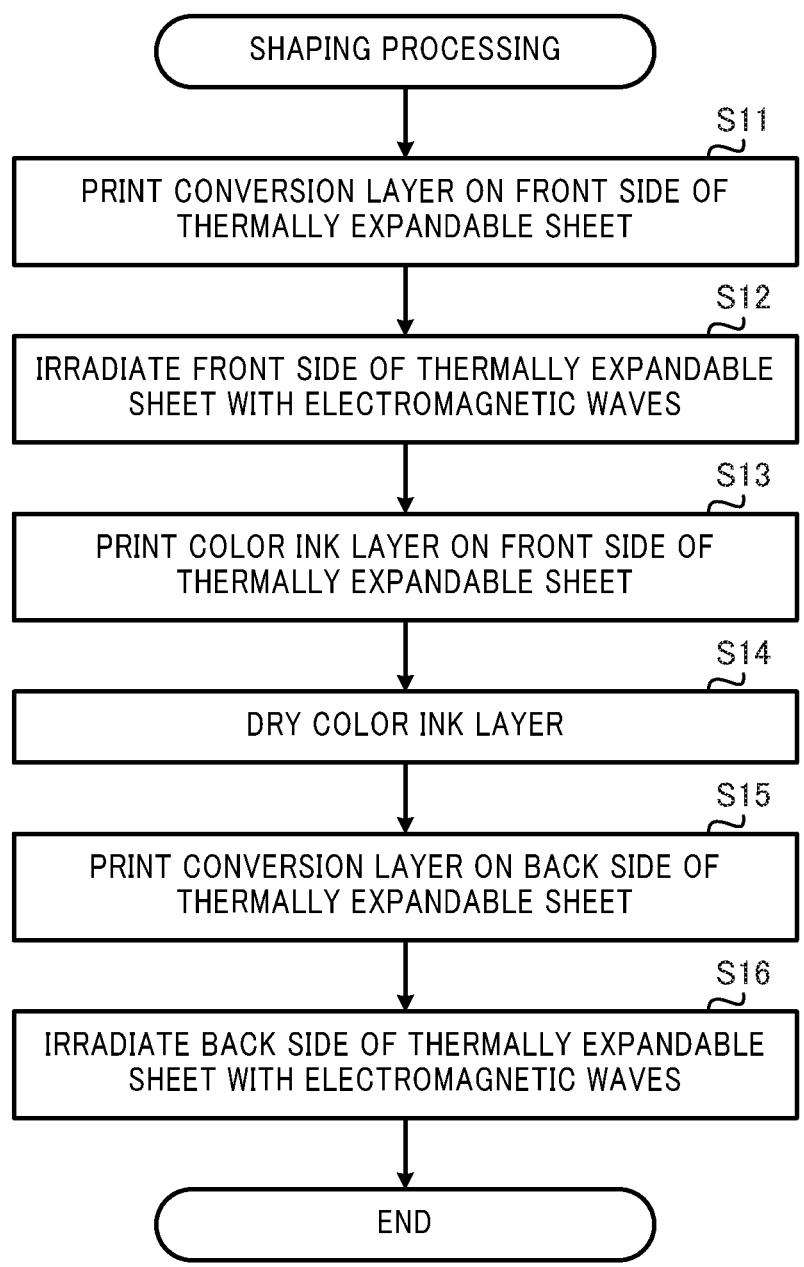

SHAPED OBJECT, SHAPING SYSTEM, AND PRODUCTION METHOD FOR SHAPED OBJECT

CROSS-REFERENCE TO RELATED APPLICATION

This application claims the benefit of Japanese Patent Application No. 2017-154421, filed on Aug. 9, 2017, the entire disclosure of which is incorporated by reference herein.

FIELD

This application relates generally to a shaped object, a shaping system, and a production method for a shaped object.

BACKGROUND

Techniques are known for shaping shaped objects (also referred to as three-dimensional objects). For example, Unexamined Japanese Patent Application Kokai Publication Nos. S64-28660 and 2001-150812 describe forming methods for images that extend in three-dimensions or, in other words, three-dimensional images. Specifically, in the methods described in Unexamined Japanese Patent Application Kokai Publication Nos. S64-28660 and 2001-150812, a pattern is formed on the back side of a thermally expandable sheet using a material having excellent light absorptivity, and the formed pattern is heated by irradiating the pattern with light using irradiation means. As a result, the portion of the thermally expandable sheet where the pattern is formed expands and rises, and a three-dimensional image is formed.

Real objects, that is, tangible objects, deteriorate with the passage of time due to dirt, corrosion, wear, or the like. There is a demand to express, in an easy-to-understand manner, the manner in which such objects deteriorate.

SUMMARY

In order to solve the problem described above, a shaped object of the present disclosure includes:

a first shaped portion expressing a three-dimensional shape of an object in a first state by at least one bump on a surface of a first thermally expansive section that expands due to being heated; and a second shaped portion expressing a three-dimensional shape of the object in a second state by at least one bump on a surface of a second thermally expansive section that expands due to being heated;

wherein the second state is a state in which the object is more deteriorated than in the first state; and a height of the at least one bump on the surface of the second thermally expansive section at least partially differs from a height of the at least one bump on the surface of the first thermally expansive section.

A shaping system according to the present disclosure includes:

a generator that generates, from a first shaping image for shaping a first shaped portion expressing a three-dimensional shape of an object in a first state, a second shaping image for shaping a second shaped portion expressing a three-dimensional shape of the object in a second state, the object being more deteriorated in the second state than in the first state;

a printer that prints the first shaping image in a first thermally expansive section that expands due to being heated using a material that converts electromagnetic waves to heat, and that prints the second shaping image generated by the generator in a second thermally expansive section that expands due to being heated using the material; and an expander that (i) irradiates the first thermally expansive section in which the first shaping image is printed by the printer with electromagnetic waves, thereby causing the first thermally expansive section to expand and shaping the first shaped portion, and (ii) irradiates the second thermally expansive section in which the second shaping image is printed by the printer with electromagnetic waves, thereby causing the second thermally expansive section to expand and shaping the second shaped portion.

A production method for a shaped object according to the present disclosure includes:

generating, from a first shaping image for shaping a first shaped portion expressing a three-dimensional shape of an object in a first state, a second shaping image for shaping a second shaped portion expressing a three-dimensional shape of the object in a second state, the object being more deteriorated in the second state than in the first state;

printing the first shaping image in a first thermally expansive section that expands due to being heated using a material that converts electromagnetic waves to heat, and printing the second shaping image in a second thermally expansive section that expands due to being heated using the material; and irradiating the first thermally expansive section, in which the first shaping image is printed, with electromagnetic waves, thereby causing the first thermally expansive section to expand and shaping the first shaped portion, and irradiating the second thermally expansive section, in which the second shaping image is printed, with electromagnetic waves, thereby causing the second thermally expansive section to expand and shaping the second shaped portion.

BRIEF DESCRIPTION OF THE DRAWINGS

A more complete understanding of this application can be obtained when the following detailed description is considered in conjunction with the following drawings, in which:

FIG. 14 is a flowchart illustrating the flow of printing data generation processing, executed by the terminal device, according to Embodiment 1;

FIG. 15 is a flowchart illustrating the flow of shaping processing, executed by the printing device and the expansion device, according to Embodiment 1;

DETAILED DESCRIPTION

Figure 1:
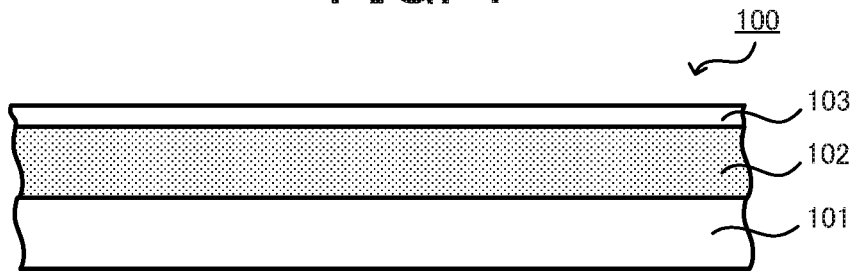
FIG. 1 is a cross-sectional view of a thermally expandable sheet for shaping a shaped object according to Embodiment 1 of the present disclosure.

Hereinafter, embodiments of the present disclosure are described while referencing the drawings. Note that, in the drawings, identical or corresponding components are marked with the same reference numerals.

Embodiment 1

Thermally Expandable Sheet 100

FIG. 1 illustrates the cross-sectional structure of a thermally expandable sheet (also referred to as thermally distensible sheet) 100 for shaping a shaped object according to Embodiment 1. The thermally expandable sheet 100 is a medium in which a pre-selected portion is heated and thereby expands to shape a shaped object. The shaped object is an object having a three-dimensional shape and is shaped in the two-dimensional sheet by a portion of the sheet expanding in a direction perpendicular to the sheet. The shaped object is also referred to as a three-dimensional object or a three-dimensional image. The shaped object may have a general shape such as a simple shape, a geometrical shape, or a character.

The shaped object according to the present embodiments uses as a reference a particular two-dimensional plane (for example, the XY plane) within three-dimensional space, and includes unevenness in a direction perpendicular (for example, the Z-axis direction) to that plane. Such a shaped object is an example of a three-dimensional (3D) image, but to distinguish this shaped object from a three-dimensional image produced using a so-called 3D printing technique, the shaped object is called a 2.5-dimensional (2.5D) image or a pseudo-three-dimensional (pseudo-3D) image. Furthermore, the technique for producing the shaped object is an example of a three-dimensional image printing technique, but to distinguish this technique from a so-called 3D printer, the technique is called a 2.5-dimensional (2.5D) printing technique or a pseudo-three-dimensional (pseudo-3D) printing technique.

As illustrated in FIG. 1, the thermally expandable sheet 100 includes, in this order, a base 101, a thermally expansive layer 102, and an ink receiving layer 103. Note that, FIG. 1 illustrates a cross-section of the thermally expandable sheet 100 in a state prior to the shaped object being shaped or, in other words, in a state in which no portions of the thermally expandable sheet 100 are distended.

The base 101 is a sheet-like medium that becomes the base of the thermally expandable sheet 100. The base 101 is a support body that supports the thermally expansive layer 102 and the ink receiving layer 103, and is responsible for maintaining the strength of the thermally expandable sheet 100. Common printer paper, for example, can be used as the base 101. However the material of the base 101 is not particularly limited and examples thereof include synthetic paper, canvas and similar fabrics, and plastic films such as polypropylene, polyethylene terephthalate (PET), and polybutylene terephthalate (PBT).

The thermally expansive layer 102 is laminated on the top side of the base 101, and is a layer that expands as a result of being heated to a certain temperature or higher. The thermally expansive layer 102 includes a binder and a thermally expandable agent dispersed in the binder. The binder is a thermoplastic resin such as ethylene-vinyl-acetate polymer or acrylic polymer. Specifically, the thermally expandable agent is thermally expandable microcapsules (micropowder) having a particle size of about 5 to 50 µm. These microcapsules are formed by encapsulating a substance that vaporizes at a low boiling point such as propane or butane in a thermoplastic resin shell. When the thermally expandable agent is heated to a temperature of about 80° C. to 120° C., for example, the encapsulated substance vaporizes and the thermally expandable agent foams and distends due to the resulting pressure. Thus, the thermally expansive layer 102 distends according to the amount of heat absorbed. The thermally expandable agent is also called a foaming agent.

The ink receiving layer 103 is a layer that is laminated on the top side of the thermally expansive layer 102 and that absorbs and receives ink. The ink receiving layer 103 receives printer ink used in ink jet printers, printer toner used in laser printers, inks of ballpoint pens or fountain pens, graphite of pencils, and the like. The ink receiving layer 103 is formed from a material suitable for holding these inks and the like on the surface of the ink receiving layer 103. A general-purpose material used for ink jet paper, for example, can be used as the material of the ink receiving layer 103.

Figure 2A:
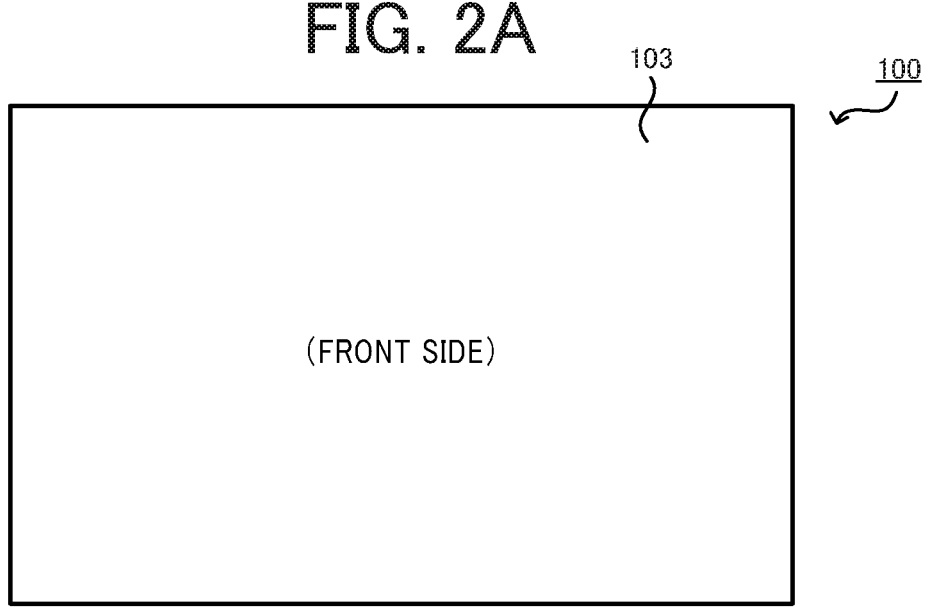
FIGS. 2A and 2B are drawings respectively illustrating the front side and the back side of the thermally expandable sheet illustrated in FIG. 1.
Figure 2B:
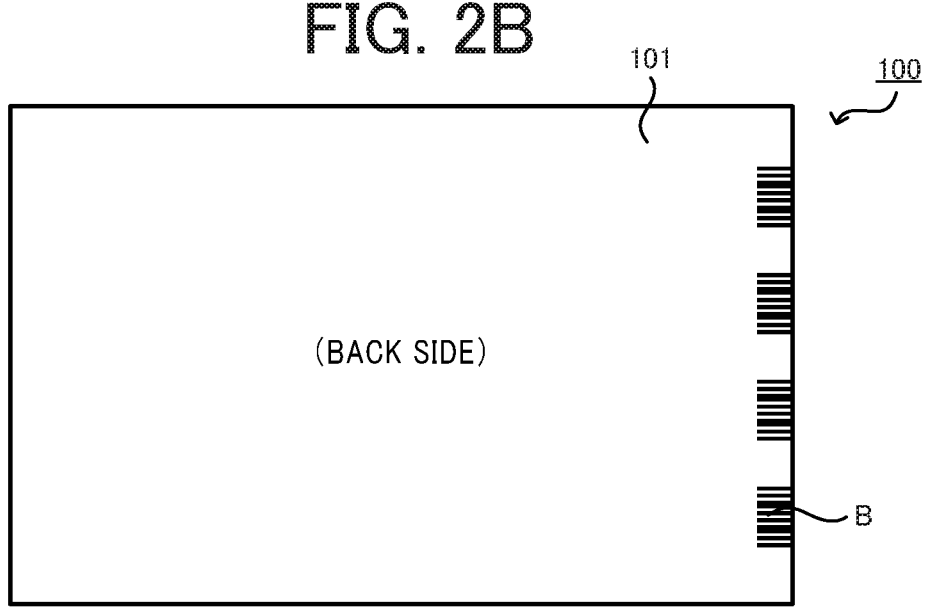

FIGS. 2A and 2B respectively illustrate the front side and the back side of the thermally expandable sheet 100. The front side of the thermally expandable sheet 100 is a face on the side that receives the ink, and corresponds to the front side of the ink receiving layer 103. The back side of the thermally expandable sheet 100 is a face on the base 101 side of the thermally expandable sheet 100, and corresponds to the back side of the base 101.

As illustrated in FIG. 2B, a plurality of barcodes B are affixed along the edge of the back side of the thermally expandable sheet 100. The barcodes B are identifiers for identifying the thermally expandable sheet 100, and indicate that the thermally expandable sheet 100 is a dedicated sheet for shaping a shaped object. The barcodes B are read by an expansion device 50 and are used to determine whether the thermally expandable sheet 100 is to be used in the expansion device 50.

A shaping system 1 according to Embodiment 1 can shape a shaped object on the thermally expandable sheet 100 described above. Carbon molecules are printed on the portion of the front side or the back side of the thermally expandable sheet 100 that molecules to be caused to expand. The carbon particles are contained in a black (carbon black) ink or an ink of another color, and constitute a type of electromagnetic wave heat conversion material (exothermic agent) that absorbs and converts electromagnetic waves to heat. The carbon molecules absorb electromagnetic waves and thermally vibrate, thereby generating heat. When the portion of the thermally expandable sheet 100 where the carbon molecules have been printed is heated, the corresponding portion of the thermally expansive layer 102 distends and bumps are formed. A protruding or uneven shape is formed by the bumps of the thermally expansive layer 102 and, as a result, a shaped object is shaped in the thermally expandable sheet 100.

A variety of shaped objects can be shaped by combining the locations where and the heights to which the thermally expandable sheet 100 is caused to expand. Note that shaping is also called molding. Additionally, the expression of aesthetics or texture through visual or tactile sensation by shaping (molding) is referred to as "decorating (ornamenting)".

Figure 3:
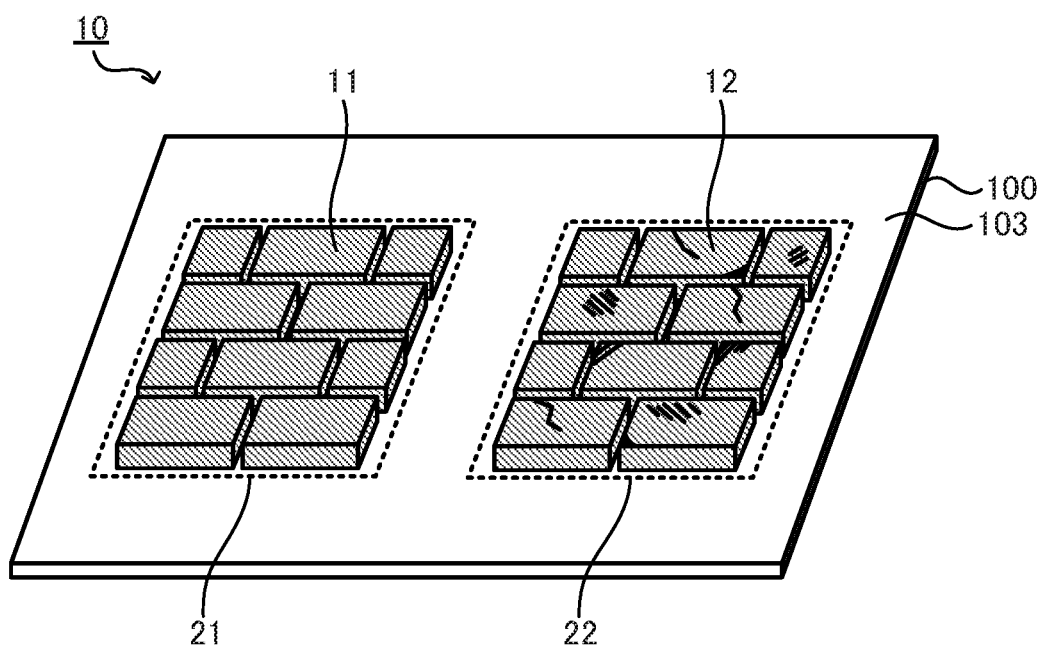
FIG. 3 is a drawing illustrating an example of the shaped object according to Embodiment 1.

FIG. 3 illustrates an example of a shaped object 10 shaped on the thermally expandable sheet 100. The shaped object 10 is a sample that pseudo-expresses the manner in which an object deteriorates. Here, the term "object" refers to the tangible object that is expressed by the three-dimensional shape of the shaped object 10. In the example of FIG. 3, the object is bricks that are used as the outer wall material of a building.

Here, the phrase "deterioration of the object" refers to changes over time in the appearance of the object due to dirt, corrosion, wear, and the like, that is, this phrase refers to the aging of the object. For example, depending on how the object is used, the object may be exposed to sunlight, wind and rain, air pollution, and the like and, as a result, over time the surface thereof may gradually become discolored, cracked, chipped, or the like. The shaped object 10 expresses the deterioration of the object by a three-dimensional shape, which is formed by the thermally expandable sheet 100 expanding.

As illustrated specifically in FIG. 3, the shaped object 10 includes a first shaped portion 11 shaped in a first thermally expansive section 21 that expands by being heated, and a second shaped portion 12 shaped in a second thermally expansive section 22 that expands due to being heated. The first thermally expansive section 21 is a first section of the thermally expandable sheet 100 and corresponds to the area surrounded by the dashed box on the left side in the example illustrated in FIG. 3. The second thermally expansive section 22 is a second section of the thermally expandable sheet 100 and corresponds to the area surrounded by the dashed box on the right side in the example illustrated in FIG. 3.

The first shaped portion 11 expresses the three-dimensional shape of the object in a first state by bumps on the surface of the first thermally expansive section 21. The "first state of the object" refers to a state in which the object has not deteriorated or, in other words, a state immediately following production in which the object is new. The "bumps on the surface of the first thermally expansive section 21" are the result of the surface of the first thermally expansive section 21 rising due to the thermally expansive layer 102 in the first thermally expansive section 21 being heated and caused to distend. The first shaped portion 11 has at least one or more of these bumps, and expresses, in a non-deteriorated state, the three-dimensional shape of a plurality of blocks of the object, that is, the bricks, by the uneven shape formed by the bumps.

The second shaped portion 12 expresses the three-dimensional shape of the object in a second state by bumps on the surface of the second thermally expansive section 22. The "second state of the object" refers to a state in which the object is more deteriorated than in the first state or, in other words, a state in which time has passed from when the object was produced and the object has aged. The "bumps on the surface of the second thermally expansive section 22" are the result of the surface of the second thermally expansive section 22 rising due to the thermally expansive layer 102 in the second thermally expansive section 22 being heated and caused to distend. The second shaped portion 12 has at least one or more of these bumps, and expresses, in a deteriorated state, the three-dimensional shape of the plurality of blocks of the object, that is, the bricks, by the uneven shape formed by the bumps.

In order to express the differences in the three-dimensional shape between the new and old states (when non-deteriorated and when deteriorated) of the object, the heights of the bumps on the surface of the second thermally expansive section 22 at least partially differs from the heights of the bumps on the surface of the first thermally expansive section 21. Specifically, as illustrated in FIG. 3, as an example of the object in a deteriorated state, the second shaped portion 12 expresses a state in which cracks, chips, damage, abrasion, and the like have occurred in the surface of the bricks. In contrast, as an example of the object in a non-deteriorated state, the first shaped portion 11 expresses a state in which no cracks or the like have occurred in the surface of the bricks and the surface of the bricks is smooth. Thus, the second shaped portion 12 expresses the three-dimensional shape of the object in a deteriorated state by the heights of the bumps on the surface being changed in the portions where cracks and the like have occurred, compared to in the first shaped portion 11.

Additionally, the first shaped portion 11 has color imitating the object in the non-deteriorated state, and the second shaped portion 12 has color imitating the object in a deteriorated state. Specifically, the surface of the first shaped portion 11 is colored with color that imitates the color of the bricks in a non-deteriorated state. In contrast, in order to express the differences in appearance between the new and old states of the object, the color of the second shaped portion 12 at least partially differs from the color of the first shaped portion 11. Specifically, in the example illustrated in FIG. 3, as an example of the object in a deteriorated state, a state is expressed in which the surface of the bricks is discolored due to dirt, corrosion, and the like.

Thus, the shaped object 10 according to Embodiment 1 simulatively expresses the appearances of the object when new and old by the color and the bumps on the surfaces the two thermally expansive sections 21 and 22. The shaped object 10 simulates the three-dimensional shape of the object by the bumps and is also colored with color that imitates the object. As such, the shaped object 10 can simulate the object with greater accuracy. Additionally, the two shaped portions 11 and 12 that express the new and old states are disposed side-by-side so as to be adjacent to each other on the thermally expandable sheet 100. As such, a user can easily compare the two shaped portions 11 and 12 and ascertain the manner in which the object deteriorates.

Moreover, the planar size (area) of the two thermally expansive sections 21 and 22 may be set to the same size to facilitate comparison of the two shaped portions 11 and 12.

Shaping System 1

Figure 4:
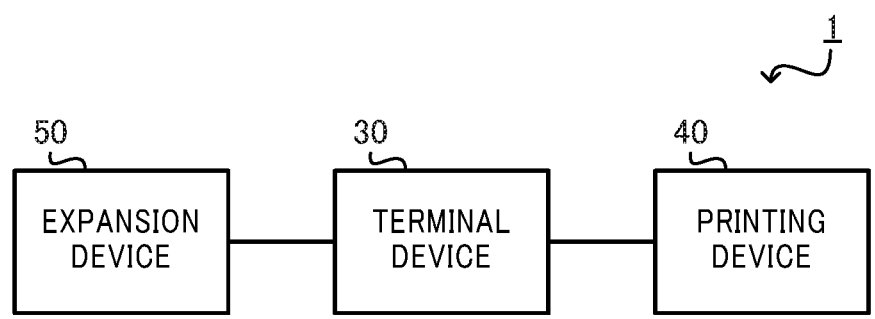
FIG. 4 is a drawing illustrating a schematic configuration of a shaping system according to Embodiment 1.

Next, while referencing FIG. 4, a description will be given of the shaping system 1 that shapes the shaped object 10 on the thermally expandable sheet 100. As illustrated in FIG. 4, the shaping system 1 includes a terminal device 30, a printing device 40, and an expansion device 50.

Figure 5:
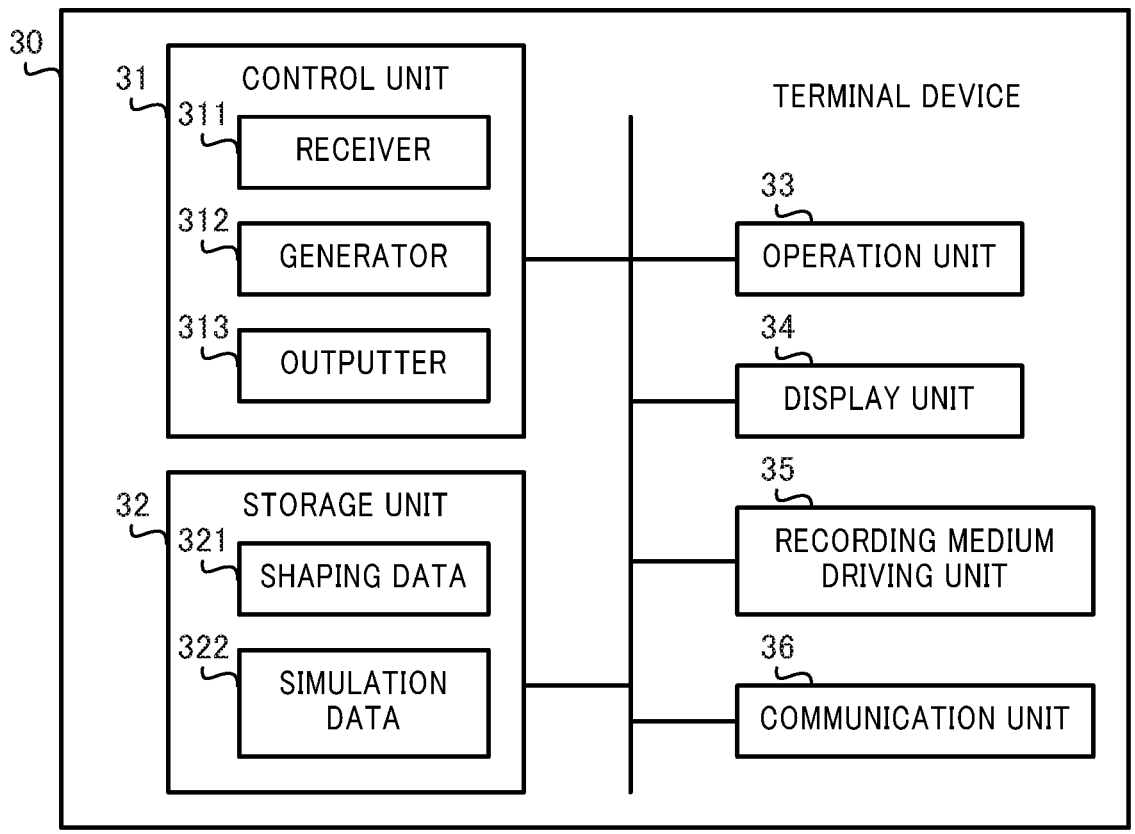
FIG. 5 is a block diagram illustrating the configuration of a terminal device according to Embodiment 1.

The terminal device 30 is an information processing device such as a personal computer, a smartphone, or a tablet, and is a control unit that controls the printing device 40 and the expansion device 50. As illustrated in FIG. 5, the terminal device 30 includes a control unit 31, a storage unit 32, an operation unit 33, a display unit 34, a recording medium driving unit 35, and a communication unit 36. Each of these units is connected to a bus for transmitting signals.

The control unit 31 includes a central processing unit (CPU), read-only memory (ROM), and random-access memory (RAM). In one example, the CPU is a microprocessor or the like and is a central processing unit that executes a variety of processing and computation. In the control unit 31, the CPU reads a control program stored in the ROM and controls the operations of the entire terminal device 30 while using the RAM as working memory.

The storage unit 32 is nonvolatile memory such as flash memory or a hard disk. Data and programs to be executed by the control unit 31 are stored in the storage unit 32. Additionally, as illustrated in FIG. 5, shaping data 321 for shaping the shaped object 10 in the thermally expandable sheet 100 and simulation data 322 for simulating the deterioration of the object are stored in the storage unit 32.

Specifically, data of images to be printed on the thermally expandable sheet 100 by the printing device 40 are stored as the shaping data 321 in the storage unit 32. The images to be printed on the thermally expandable sheet 100 include data of images (shaping images) for shaping three-dimensional shapes and data of images (coloring images) for coloring the shaped three-dimensional shapes.

Figure 6:
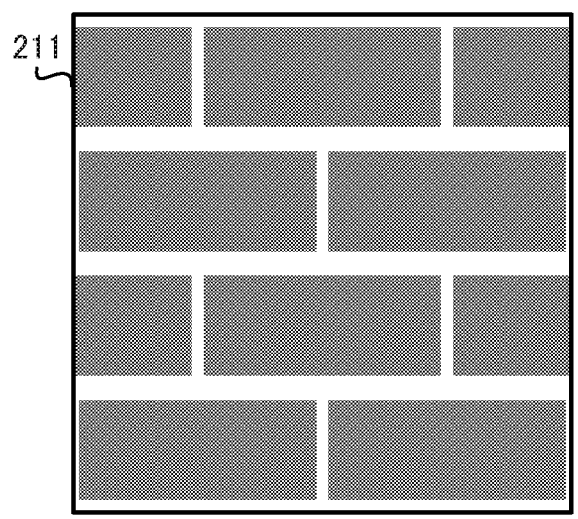
FIG. 6 is a drawing illustrating an example of a first shaping image for shaping the shaped object illustrated in FIG. 3.

FIG. 6 illustrates a first shaping image 211 for shaping the shaped object 10 illustrated in FIG. 3. The first shaping image 211 is an image for shaping the first shaped portion 11 of the shaped object 10, that is, the three-dimensional shape of the object in the non-deteriorated state. Specifically, the first shaped portion 11 is shaped as a result of the first thermally expansive section 21 of the thermally expandable sheet 100 foaming and expanding. In order to shape the first shaped portion 11, the first shaping image 211 is depicted as a gray-scale image in which the portions of thermally expandable sheet 100 to be caused to expand and the expansion heights thereof are indicated by shades of black and white.

Specifically, the three-dimensional shape of the first shaped portion 11 is expressed by the rising of portions corresponding to the plurality of blocks of the bricks. As such, as illustrated in FIG. 6, in the first shaping image 211, the concentration of the portions corresponding to the plurality of blocks is higher than the other portions. Thus, in the first shaping image 211, a gray-scale pattern is drawn in which the portions to be caused to distend greater have a higher concentration.

Note that image data (front side foaming data) to be printed on the front side of the thermally expandable sheet 100 and image data (back side foaming data) to be printed on the back side of the thermally expandable sheet 100 is stored in the storage unit 32 as the data of the first shaping image 211. FIG. 6 illustrates an image to be printed on the front side of the thermally expandable sheet 100 as an example of the first shaping image 211.

Figure 7:
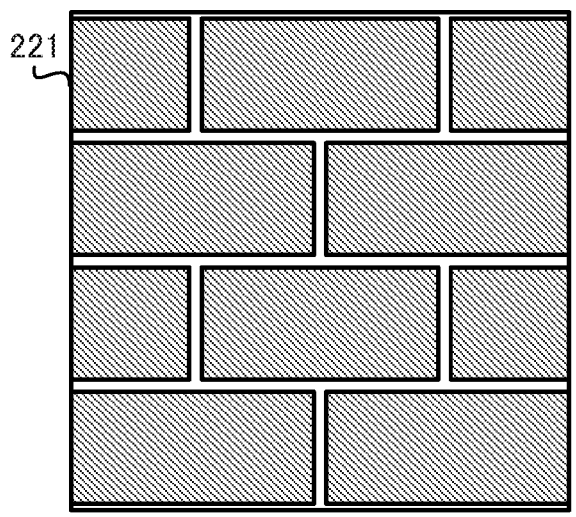
FIG. 7 is a drawing illustrating an example of a first coloring image for coloring the shaped object illustrated in FIG. 3.

FIG. 7 illustrates a first coloring image 221 for coloring the shaped object 10 illustrated in FIG. 3. The first coloring image 221 is an image indicating the color with which the first shaped portion 11 of the shaped object 10, that is, the three-dimensional shape of the object in the non-deteriorated state, is to be colored. Specifically, as illustrated in FIG. 7, the portions corresponding to the plurality of blocks of the bricks are colored with color that imitates the color of the bricks in the non-deteriorated state. The first coloring image 221 is printed on the front side of the thermally expandable sheet 100 using at least one color of ink among color inks.

Note that, in addition to the first shaping image 211 for shaping the shaped object 10 and the first coloring image 221 illustrated in FIGS. 6 and 7, data of coloring images and shaping images for shaping shaped objects that imitate a variety of objects are stored in the storage unit 32. This data of shaping images and coloring images is read from a recording medium by the recording medium driving unit 35 or is acquired from an external device via the communication unit 36, and is stored in advance in the storage unit 32.

Returning to FIG. 5, the operation unit 33 includes an input device such as a keyboard, a mouse, buttons, a touch pad, or a touch panel, and receives operations from the user. The user can input operations to edit the shaping data 321 or input a command to start shaping processing of the shaped object 10 by operating the operation unit 33.

The display unit 34 includes a display device such as a liquid crystal display or an organic electro luminescence (EL) display, and a display driving circuit that displays images on the display device. In one example, the display unit 34 displays the shaping data 321 such as the first shaping image 211 and the first coloring image 221. Additionally, as necessary, the display unit 34 displays information indicating the current state of the printing device 40 or the expansion device 50.

The recording medium driving unit 35 reads programs or data stored in a portable recording medium. Examples of the portable recording medium include a compact disc (CD) ROM, a digital versatile disc (DVD) ROM, and flash memory provided with a universal serial bus (USB) standard connector. In one example, the recording medium driving unit 35 reads and acquires the shaping data 321 from the portable recording medium.

The communication unit 36 includes an interface for communicating with external devices, including the printing device 40 and the expansion device 50. The terminal device 30 is connected to the printing device 40 and the expansion device 50 via a wire such as a flexible cable or a wired local area network (LAN) or is wirelessly connected to the printing device 40 and the expansion device 50 via a wireless LAN, Bluetooth (registered trademark), or the like. The communication unit 36 communicates with the printing device 40, the expansion device 50, and other external devices in accordance with at least one of these communication protocols under the control of the control unit 31.

As illustrated in FIG. 5, the control unit 31 functionally includes a receiver 311 functioning as receiving means, a generator 312 functioning as generating means, and an outputter 313 functioning as outputting means. In the control unit 31, the CPU performs control and reads the program stored in the ROM out to the RAM and execute that program, thereby functioning as the various components described above.

The receiver 311 receives, from the user, designations of the environment surrounding the object and the elapsed time from when the object was placed in that environment. The phrase, "environment surrounding the object" refers to the location, the season, the weather, and the like where the object is placed. In one example, when the object is the outer wall material (bricks) illustrated in FIG. 3, the environment surrounding the object is the location of the building constructed using the outer wall material, and the conditions of the surroundings of that building.

Specifically, air tends to be more polluted when the location where the object is placed is near an expressway than when not near an expressway and, consequently, the object is more likely to become dirty. Moreover, the manner in which the object deteriorates varies depending on the amount of rainfall and the season. Additionally, the degree to which the object deteriorates increases with longer amounts of elapsed time from when the object was placed in the environment. Thus, the environment and the elapsed time are factors (parameters) that influence the manner in which the object deteriorates. In one example, in a case where evaluating the degradation state of the object when the object has been placed at a specific location in the Tokyo metropolitan area for 10 years, the user operates the operation unit 33, designates that location as the environment surrounding the object, and designates the elapsed time as 10 years. The receiver 311 receives the designations of the environment and the elapsed time input in this manner by the user. The receiver 311 is realized by cooperation between the control unit 31 and the operation unit 33.

The generator 312 generates printing data to be printed in the printing device 40 from the shaping data 321 stored in the storage unit 32. Specifically, the generator 312 estimates, by simulation, the degradation state of the object according to the designations of the environment and the elapsed time received by the receiver 311.

The generator 312 references the simulation data 322 stored in the storage unit 32 to estimate the degradation state of the object. The simulation data 322 includes statistical data containing information by season for temperature, humidity, weather, wind direction, degree of air pollution, and the like for a variety of locations at which the object can be placed. The generator 312 references this statistical data to estimate the manner in which the three-dimensional shape and the color of the object will deteriorate in the designated environment and after the designated elapsed time has passed. The generator 312 can use a well-known degradation simulation algorithm to estimate the degradation state of the object from the simulation data 322. The generator 312 is realized by cooperation between the control unit 31 and the storage unit 32.

Upon estimating the degradation state of the object via simulation, the generator 312 generates, based on the estimation results, a second shaping image 212 for shaping the three-dimensional shape of the object in the deteriorated state from the first shaping image 211 for shaping the three-dimensional shape of the object in the non-deteriorated state.

Figure 8:
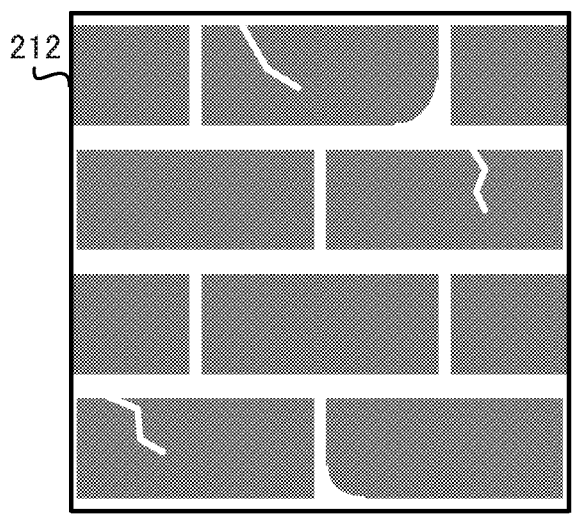
FIG. 8 is a drawing illustrating an example of a second shaping image for shaping the shaped object illustrated in FIG. 3.

FIG. 8 illustrates an example of the second shaping image 212. The second shaping image 212 is an image for shaping the second shaped portion 12 of the shaped object 10 illustrated in FIG. 3. As with the first shaping image 211 illustrated in FIG. 6, in the second shaping image 212, the portions of thermally expandable sheet 100 to be caused to expand and the expansion heights thereof are indicated by shades of black and white.

As illustrated in FIG. 8, in the second shaping image 212, as with the first shaping image 211, the concentration of the portions corresponding to the plurality of blocks is higher than the other portions. However, the second shaping image 212 differs from the first shaping image 211 in that, of the portions corresponding to the plurality of blocks, the density of the portions corresponding to cracks, chips, and the like is lower. Thus, by changing the density of the image, the cracks, chips, and the like caused by deterioration are expressed by differences in the heights of the bumps on the thermally expandable sheet 100.

The generator 312 estimates the magnitude of the cracks, chips, and the like resulting from this deterioration on the basis of the simulation data 322. Additionally, the generator 312 may determine the positions at which cracks, chips, and the like will occur by estimating the portions where cracks, chips, and the like are more likely to occur based on the shape and manner of installation of the object. Alternatively, the generator 312 may randomly determine the positions at which cracks, chips, and the like will occur using random numbers.

Note that processing to generate the second shaping image 212 from the first shaping image 211 is carried out for each of the image data (front side foaming data) to be printed on the front side of the thermally expandable sheet 100 and image data (back side foaming data) to be printed on the back side of the thermally expandable sheet 100.

Furthermore, based on the results of estimating, by simulation, the deterioration state of the object, the generator 312 generates a second coloring image 222 for coloring the three-dimensional shape of the object in the deteriorated state from the first coloring image 221 for coloring the three-dimensional shape of the object in the non-deteriorated state.

Figure 9:
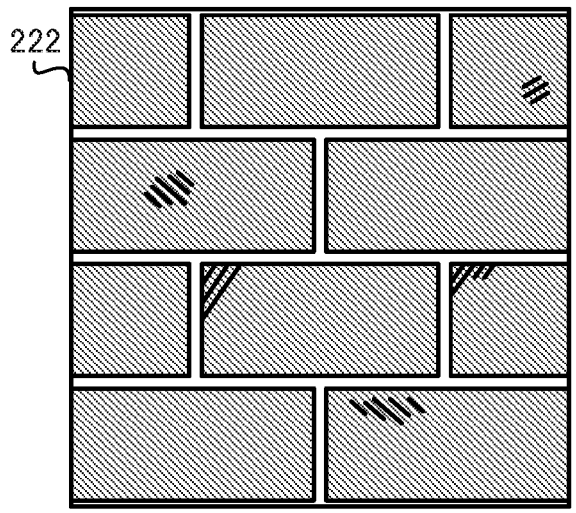
FIG. 9 is a drawing illustrating an example of a second coloring image for coloring the shaped object illustrated in FIG. 3.

FIG. 9 illustrates the second coloring image 222. The second coloring image 222 is an image for coloring the second shaped portion 12 of the shaped object 10 illustrated in FIG. 3. The second coloring image 222 is an image that is printed on the front side of the thermally expandable sheet 100 using at least one color of ink among color inks, similar to the first coloring image 221 illustrated in FIG. 7.

As illustrated in FIG. 9, with the second coloring image 222, similar to the first coloring image 221, the portions corresponding to the plurality of blocks of the bricks are colored with color that imitates the color of the bricks. However, the second coloring image 222 differs from the first coloring image 221 in that, of the portions corresponding to the plurality of blocks, the color of the portions corresponding to dirt, corrosion, and the like is darker. Thus, the dirt, corrosion, and the like caused by deterioration are expressed by changing the color in the image.

The generator 312 estimates the magnitude of the dirt, corrosion, and the like resulting from this deterioration on the basis of the simulation data 322. Additionally, the generator 312 may determine the positions at which dirt, corrosion, and the like will occur by estimating the portions where dirt, corrosion, and the like are more likely to occur based on the shape and manner of installation of the object. Alternatively, the generator 312 may randomly determine the positions at which dirt, corrosion, and the like will occur using random numbers.

Upon the generation of the second shaping image 212 and the second coloring image 222 as described above, the generator 312 generates data of the shaping images 211 and 212 and data of the coloring images 221 and 222 as the printing data to be printed by the printing device 40.

Returning to FIG. 5, the outputter 313 outputs the printing data generated by the generator 312 to the printing device 40. Specifically, upon the generation of the printing data by the generator 312, the outputter 313 communicates with the printing device 40 via the communication unit 36, and outputs the generated printing data to the printing device 40. At this time, the outputter 313 outputs the printing data and, together therewith, printing control data including a command to execute printing and setting information to be applied when printing, in accordance with the printing data. The outputter 313 is realized by cooperation between the control unit 31 and the communication unit 36.

Printing Device 40

Next, further description is given of the shaping system 1 illustrated in FIG. 4. The printing device 40 is a printing unit that prints an image on the front side or the back side of the thermally expandable sheet 100. The printing device 40 is an ink jet printer that prints images via a method in which ink is micronized and directly sprayed on print media. The printing device 40 functions as printing means (a printer).

Figure 10:
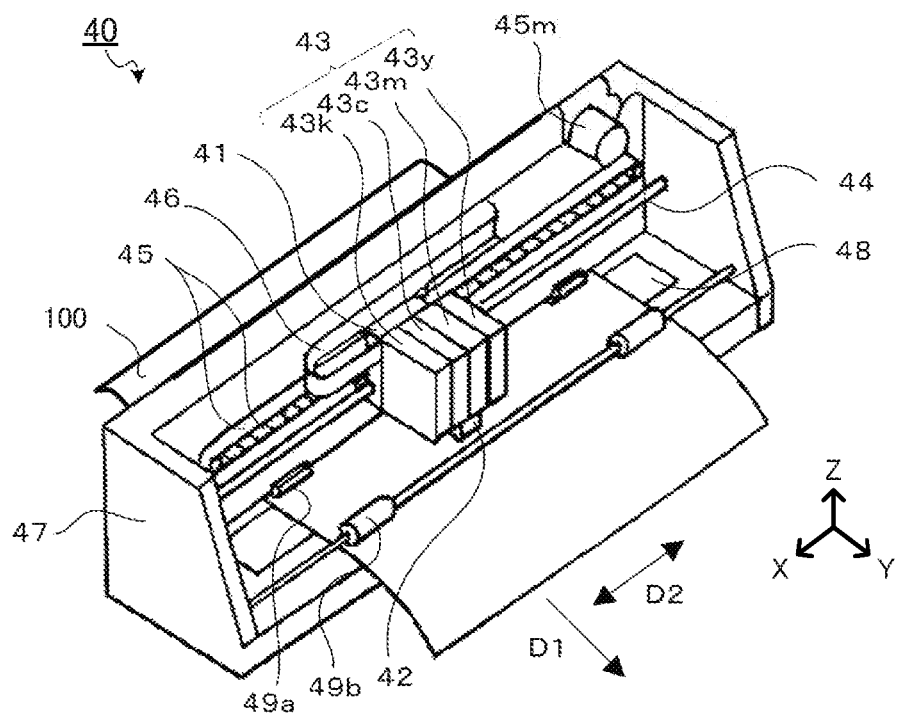
FIG. 10 is a perspective view illustrating the configuration of a printing device according to Embodiment 1.

FIG. 10 illustrates the detailed configuration of the printing device 40. As illustrated in FIG. 10, the printing device 40 includes a carriage 41 capable of reciprocating movement in a main scanning direction D2 (the X-direction), which is orthogonal to a sub scanning direction D1 (the Y-direction). The sub scanning direction D1 is the direction in which the thermally expandable sheet 100 is transported.

A print head 42 that executes the printing and ink cartridges 43 (43k, 43c, 43m, and 43y) containing ink are attached to the carriage 41. The ink cartridges 43k, 43c, 43m, and 43y respectively contain black (K), cyan (C), magenta (M), and yellow (Y) color ink. Each color of ink is discharged from a corresponding nozzle of the print head 42.

The carriage 41 is supported slideably on a guide rail 44, and is sandwiched between drive belts 45. The drive belts 45 are driven by the rotation of a motor 45m and, as a result, the carriage 41 moves in the main scanning direction D2 together with the print head 42 and the ink cartridges 43.

A platen 48 is provided in a lower portion of a frame 47, at a position facing the print head 42. The platen 48 extends in the main scanning direction D2 and constitutes a portion of a transport path of the thermally expandable sheet 100. A pair of feed rollers 49a (lower roller not illustrated in the drawings) and a pair of discharge rollers 49b (lower roller not illustrated in the drawings) are provided on the transport path of the thermally expandable sheet 100. The pair of feed rollers 49a and the pair of discharge rollers 49b transport the thermally expandable sheet 100, supported by the platen 48, in the sub scanning direction D1.

While not illustrated in the drawings, the printing device 40 includes a control unit such as a CPU, and a storage unit such as ROM, RAM and nonvolatile memory. In the control unit, the CPU control the operations of the printing device 40 by executing a control program stored in the ROM while using the RAM as working memory. Additionally, the printing device 40 is connected to the terminal device 30 via a flexible communication cable 46. In accordance with the control by the control unit, the printing device 40 acquires the printing data and the printing control data from the terminal device 30 via the flexible communication cable 46. Then, the printing device 40 executes printing on the thermally expandable sheet 100 in accordance with the acquired printing data and printing control data.

First, the printing device 40 prints the first shaping image 211 in the first thermally expansive section 21 of the thermally expandable sheet 100 using carbon black-containing black ink. Additionally, the printing device 40 prints the second shaping image 212 in the second thermally expansive section 22 of the thermally expandable sheet 100 using carbon black-containing black ink. The carbon black-containing black ink is an example of a material that converts electromagnetic waves to heat.

Second, the printing device 40 prints the first coloring image 221 in the first thermally expansive section 21 of the thermally expandable sheet 100 using at least one color of ink among the color inks. Additionally, the printing device 40 prints the second coloring image 222 in the second thermally expansive section 22 of the thermally expandable sheet 100 using at least one color of the ink among the color inks. Specifically, the color inks are cyan (C), magenta (M), and yellow (Y) inks, and black (K) ink that is free of carbon black.

The printing device 40 controls the pair of feed rollers 49a and the pair of discharge rollers 49b to transport the thermally expandable sheet 100. Additionally, the printing device 40 causes the motor 45m to rotate, thereby moving the carriage 41 and transporting the print head 42 to an appropriate position in the main scanning direction D2. Then, the printing device 40 causes the print head 72 to spray the ink toward the thermally expandable sheet 100 being transported, thereby printing the shaping images 211 and 212 and the coloring images 221 and 222.

Expansion Device 50

The expansion device 50 is an expansion unit that causes the portion of the thermally expandable sheet 100 where the gray-scale image has been printed to expand by irradiating the front side or the back side of the thermally expandable sheet 100 with electromagnetic waves and causing the gray-scale image printed on the front side or the back side of the thermally expandable sheet 100 to generate heat. The expansion device 50 functions as expanding means (an expander).

Figure 11:
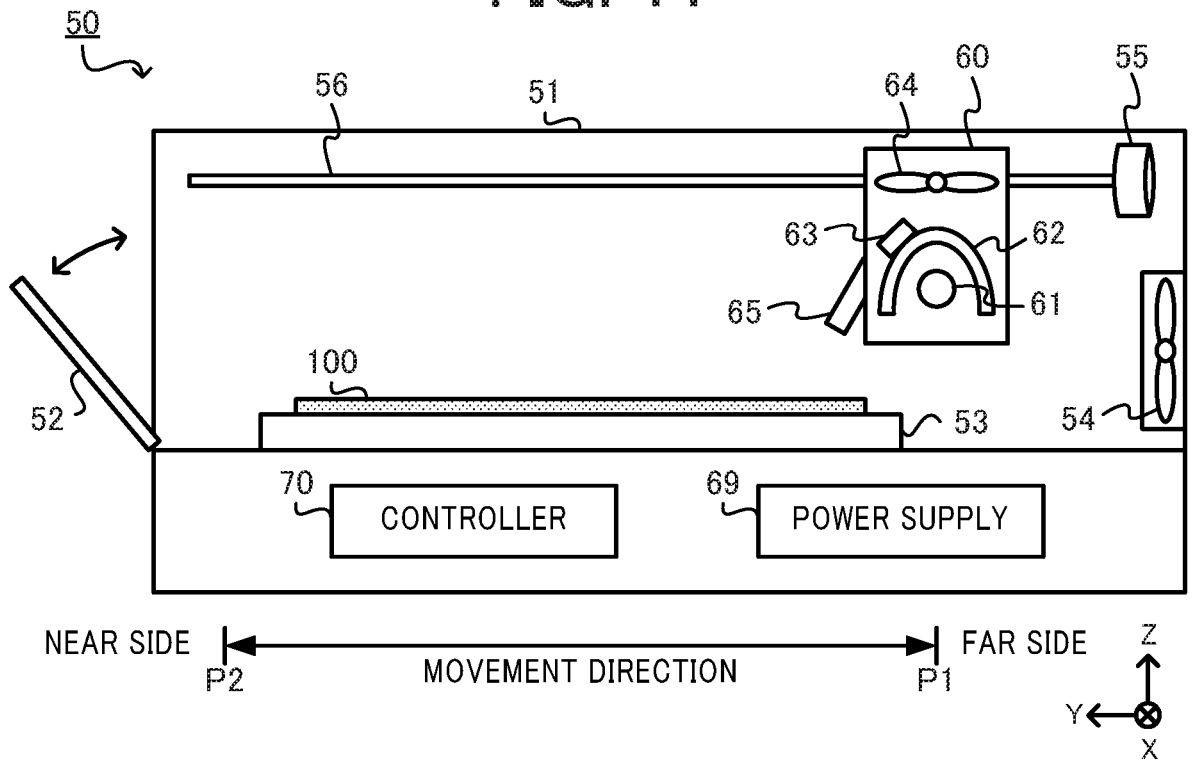
FIG. 11 is a cross-sectional view illustrating the configuration of an expansion device according to Embodiment 1.

FIG. 11 schematically illustrates the configuration of the expansion device 50. In FIG. 11, the X-direction corresponds to the width direction of the expansion device 50, the Y-direction corresponds to the longitudinal direction of the expansion device 50, and the Z-direction corresponds to the vertical direction. The X-direction, the Y-direction, and the Z-direction are orthogonal to each other. As illustrated in FIG. 11, the expansion device 50 includes a housing 51, an insertion portion 52, a tray 53, a ventilation unit 54, a transportation motor 55, a transportation rail 56, an irradiator 60, a power supply 69, and a controller 70.

The insertion portion 52 includes an openable/closeable door, and is a mechanism for inserting the thermally expandable sheet 100 into the interior of the housing 51. The user opens the insertion portion 52 and slides and pulls the tray 53 to the near side. Then, the user sets the thermally expandable sheet 100 on the tray 53 with the front side or the back side of the thermally expandable sheet 100 facing upward. At this time, the user sets the thermally expandable sheet 100 on the tray 53 so that the edge of the thermally expandable sheet 100 where the barcodes B are located is on the far side. Then, the tray on which the thermally expandable sheet 100 has been set is returned to inside the housing 51, and the insertion portion 52 is closed. Thus, the thermally expandable sheet 100 is disposed at a position where the thermally expandable sheet 100 can be irradiated with electromagnetic waves by the irradiator 60.

The tray 53 is a mechanism for setting the thermally expandable sheet 100 at an appropriate position in the housing 51. The tray 53 presses on the edges of the four sides of the set thermally expandable sheet 100 from above to secure the thermally expandable sheet 100. The tray 53 includes a sensor that detects the thermally expandable sheet 100, and detects whether the thermally expandable sheet 100 has been set and, when the thermally expandable sheet 100 has been set, detects the size of that thermally expandable sheet 100.

The ventilation unit 54 is provided at the far side end of the expansion device 50, and ventilates the interior of the expansion device 50. The ventilation unit 54 includes at least one fan, and ventilates the interior of the housing 51 by exhausting the air in the housing 51 out of the housing 51.

In one example, the transportation motor 55 is a stepping motor that operates in synchronization with pulse power, and causes the irradiator 60 to move along the front side or the back side of the thermally expandable sheet 100. The transportation rail 56 is provided in the housing 51 in the Y-direction, that is, in a direction parallel to the front side or the back side of the thermally expandable sheet 100. The irradiator 60 is attached to the transportation rail 56 so as to be capable of moving along the transportation rail 56. The irradiator 60 uses driving force resulting from the rotation of the transportation motor 55 as a power source to move back and forth along the transportation rail 56 while maintaining a certain distance from the thermally expandable sheet 100. The transportation motor 55 functions as moving means that moves the thermally expandable sheet 100 and the irradiator 60 relative to each other.

Specifically, the irradiator 60 moves back and forth between a first position P1 corresponding to the far side edge of the thermally expandable sheet 100 and a second position P2 corresponding to a near side edge of the thermally expandable sheet 100. The transportation motor 55 moves the irradiator 60 in a first direction from the first position P1 toward the second position P2, and in a second direction from the second position P2 toward the first position P1. The first position P1 is the initial position (home position) of the irradiator 60. The irradiator 60 stands by at the first position P1 when the expansion device 50 is not operating.

The irradiator 60 is a mechanism that irradiates electromagnetic waves, and irradiates the thermally expandable sheet 100 disposed on the tray 53 with electromagnetic waves. As illustrated in FIG. 11, the irradiator 60 includes a lamp heater 61, a reflection plate 62, a temperature sensor 63, a cooling unit 64, and a barcode reader 65.

In one example, the lamp heater 61 includes a halogen lamp as an irradiation source and irradiates, as electromagnetic waves, light in the near-infrared region (750 to 1400 nm wavelength range), the visible light spectrum (380 to 750 nm wavelength range), or the intermediate infrared region (1400 to 4000 nm wavelength range) at the thermally expandable sheet 100. The irradiator 60 and the lamp heater 61 irradiate light in such wavelength ranges and, as such, function as irradiating means that irradiate the thermally expandable sheet 100 with energy.

When the thermally expandable sheet 100, on which the gray-scale image formed from the carbon black-containing black ink is printed, is irradiated with light (energy), the portions where the gray-scale image is printed convert the light to heat more efficiently than the portions where the gray-scale image is not printed. As such, primarily, the portions of the thermally expandable sheet 100 where the gray-scale image is printed are heated and, when the thermally expandable agent reaches the temperature at which expansion begins, these portions expand. The irradiator 60 irradiates light (energy) while being transported by the transportation motor 55 and, as such, the irradiator 60 functions as thermal expanding means that causes the thermally expandable sheet 100 to thermally expand. Note that, the light irradiated by the lamp heater 61 is not limited to light in the wavelength ranges described above and, provided that the light is electromagnetic waves, may be of any wavelength range.

The reflection plate 62 is disposed so as to cover the top side of the lamp heater 61, and is a mechanism that reflects the light irradiated from the lamp heater 61 toward the thermally expandable sheet 100. The temperature sensor 63 is a thermocouple, a thermistor or the like, and functions as measuring means that measures the temperature of the reflection plate 62. The cooling unit 64 includes at least one fan, and cools the irradiator 60 and the interior of the housing 51 by blowing air on the irradiator 60.

The barcode reader 65 functions as reading means that reads the barcodes B provided on the back side of the thermally expandable sheet 100. The barcode reader 65 includes a light source and an optical sensor, and optically reads the barcodes B by a well-known method. The barcode reader 65 is attached to the irradiator 60 and moves together with the irradiator 60.

The power supply 69 includes a power supply integrated circuit (IC) and the like, and produces and supplies the necessary power to the various components in the expansion device 50. For example, the ventilation unit 54, the transportation motor 55, the lamp heater 61, and the cooling unit 64 receive power from the power supply 69 to operate.

The controller 70 is provided on a substrate disposed in the lower portion of the housing 51. The controller 70 includes a CPU, ROM, and RAM, and is connected to the various components of the expansion device 50 via transmission paths, that is, a system bus that transmits commands and data. In the controller 70, the CPU reads a control program stored in the ROM and controls the operations of the entire expansion device 50 while using the RAM as working memory.

Additionally, while not illustrated in the drawings, the controller 70 includes nonvolatile memory such as flash memory or a hard disk, a timekeeping device such as a real time clock (RTC), and a communication interface for communicating with the terminal device 30.

Expansion Processing

The controller 70 irradiates the thermally expandable sheet 100, on which the first shaping image 211 and the second shaping image 212 have been printed by the printing device 40, with electromagnetic waves. As a result, the controller 70 causes the first thermally expansive section 21 to expand, thereby shaping the first shaped portion 11, and causes the second thermally expansive section 22 to expand, thereby shaping the second shaped portion 12.

Figure 12:
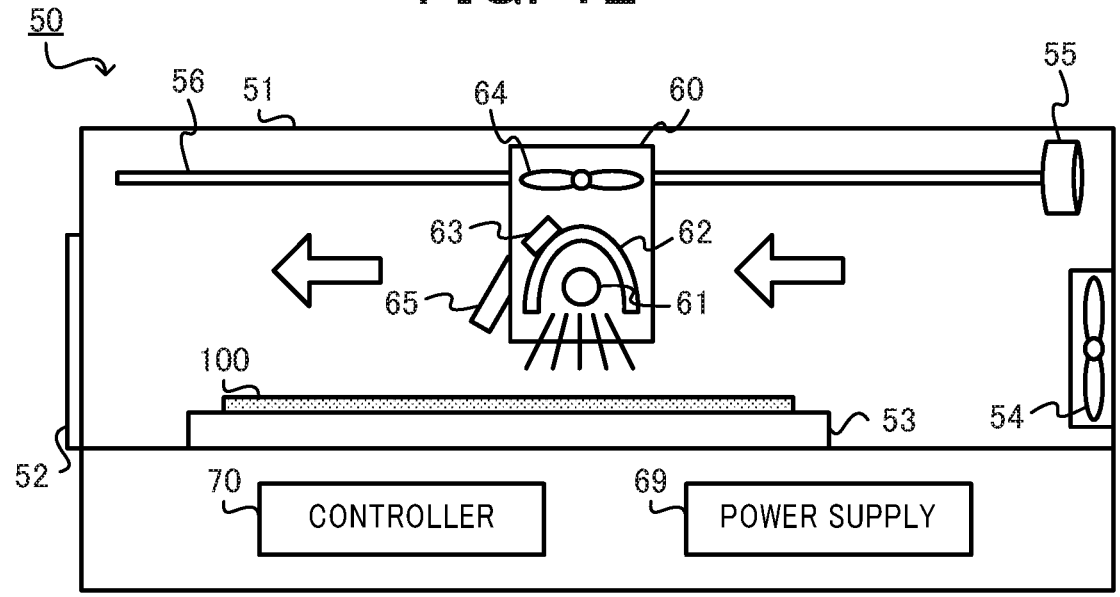
FIG. 12 is a drawing illustrating the execution of expansion processing by the expansion device according to Embodiment 1.

FIG. 12 illustrates the execution of the expansion processing by the expansion device 50. In the expansion processing, the controller 70 supplies power-supply voltage to the irradiator 60, thereby causing the lamp heater 61 to turn on. Then, while causing the irradiator 60 to irradiate electromagnetic waves, the controller 70 causes the transportation motor 55 to drive. As a result, the controller 70 causes the irradiator 60 to move exactly a specified distance from the first position P1 toward the second position P2, that is, in the first direction. Thus, the controller 70 causes the irradiator 60 to move from edge to edge of the thermally expandable sheet 100 and, as such, causes the entire front side or back side of the thermally expandable sheet 100 to be irradiated with electromagnetic waves.

The specified distance varies depending on the size of the thermally expandable sheet 100. In one example, when the size of the thermally expandable sheet 100 is A3, the specified distance is the distance from the first position P1 to the second position P2. Alternatively, when the size of the thermally expandable sheet 100 is A4, the specified distance is half the distance from the first position P1 to the second position P2.

When the electromagnetic waves are irradiated by the irradiator 60, the portions (the first thermally expansive section 21 and the second thermally expansive section 22) of the thermally expandable sheet 100 where the carbon black-containing gray-scale images (the first shaping image 211 and the second shaping image 212) have been printed generate heat and, when heated to a specified temperature, expand.

The specified temperature is the temperature at which the thermally expandable agent included in the thermally expansive layer 102 begins to expand and, in one example, is a temperature of about 80° C. to 120° C. The controller 70 causes the irradiator 60, which is irradiating electromagnetic waves at a predetermined intensity, to move at a predetermined speed, thereby heating the portions of the thermally expandable sheet 100 where the gray-scale images have been printed to the specified temperature or higher. The predetermined intensity and the predetermined speed are set in advance so as to enable heating of the thermally expandable sheet 100 to the specified temperature or higher.

Thus, the controller 70 causes the thermally expandable sheet 100 to expand by causing the irradiator 60 to move in the first direction by the transportation motor 55 and simultaneously causing the irradiator 60 to irradiate electromagnetic waves. The portions of the thermally expandable sheet 100 where the gray-scale images have been printed expand to heights corresponding to the concentrations of the black color in the gray-scale images. As a result, the first shaped portion 11 and the second shaped portion 12 are shaped in the thermally expandable sheet 100. As a result, the shaped object 10 illustrated in FIG. 3 can be obtained.

Figure 13:
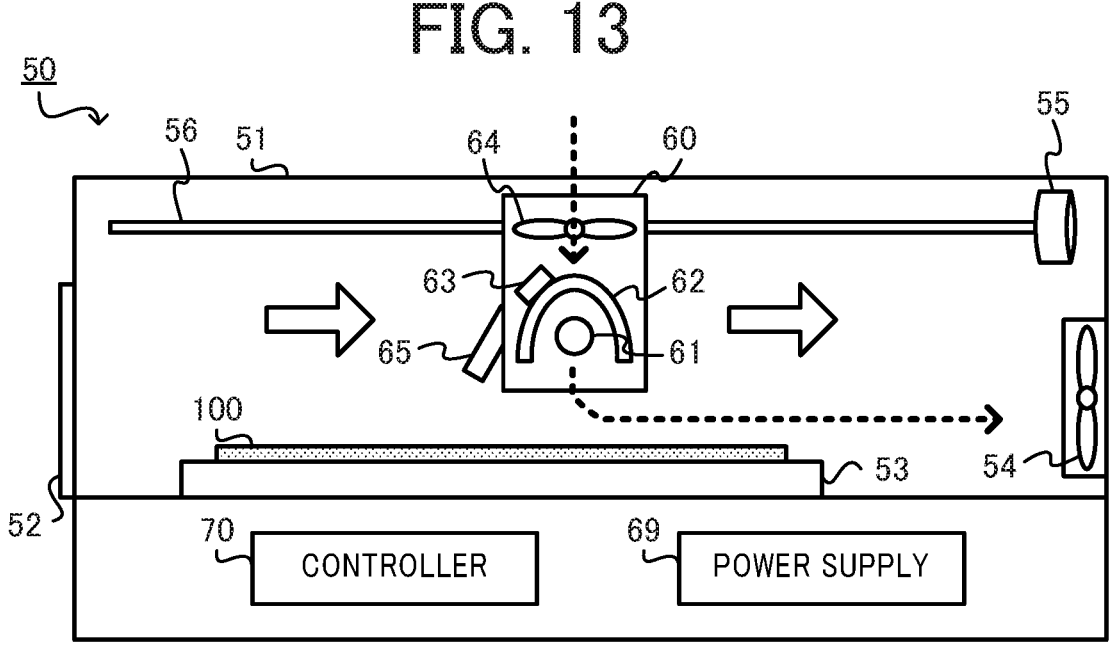
FIG. 13 is a drawing illustrating the execution of cooling processing by the expansion device according to Embodiment 1.

The irradiator 60 arrives at the second position P2 as a result of the expansion processing. After the expansion processing has been executed, as illustrated in FIG. 13, the controller 70 causes the irradiator 60 to move from the second position P2 toward the first position P1 or, in other words, returns the irradiator 60 to the initial position and, at the same time, as necessary, executes ventilation processing by the ventilation unit 54 or cooling processing by the cooling unit 64. Specifically, the controller 70 causes the ventilation unit 54 to drive, thereby exhausting the air in the housing 51, which has been heated by the expansion processing, out of the housing 51. Additionally, the controller 70 causes the cooling unit 64 to drive, thereby cooling the irradiator 60 and the thermally expandable sheet 100, which have been heated by the expansion processing.

Processing Flow of Shaping System 1

Next, the flow of the processing executed in the shaping system 1 configured as described above is described while referencing flowcharts.

First, referencing FIG. 14, the flow of printing data generation processing executed in the terminal device 30 will be described. In the printing data generation processing illustrated in FIG. 14, the control unit 31 receives a designation of the object to be expressed by shaping by the shaping system 1 (step S1). The user can operate the operation unit 33 and designate a desired object from among a plurality of objects expressible by the shaping by the shaping system 1. For example, when the shaped object 10 imitating the outer wall material illustrated in FIG. 3 is to be shaped, the user designates outer wall material as the object. The control unit 31 receives this designation, input via the operation unit 33, from the user.

When the designation of the object is received, the control unit 31 determines whether to shape a deteriorated three-dimensional shape as the three-dimensional shape of the designated object (step S2). Specifically, when starting the shaping, the user can also designate whether to shape the three-dimensional shape of the object in a deteriorated state (for example, the second shaped portion 12) in addition to shaping the three-dimensional shape of the object in a non-deteriorated state (for example, the first shaped portion 11 in FIG. 3).

When the shaping of the deteriorated three-dimensional shape is designated (step S2; YES), the control unit 31 receives the designations of the environment and the elapsed time (step S3). Specifically, the user designates the environment surrounding the object and the elapsed time from when the object was placed in that environment as parameters that influence the manner in which the object deteriorates. Thus, the control unit 31 receives the designations of the environment and the elapsed time, input via the operation unit 33, from the user. In steps S1 to S3, the control unit 31 functions as the receiver 311.

When the designations of the environment and the elapsed time are received, the control unit 31 estimates the deteriorated state of the object by simulation (step S4). Specifically, the control unit 31 estimates the manner in which the three-dimensional shape and the color of the designated object will deteriorate when in the designated environment and after the designated elapsed time has passed, based on the simulation data 322 stored in the storage unit 32.

When the deteriorated state of the object is estimated, the control unit 31 generates the printing data based on the results of the simulation (step S5). Specifically, the control unit 31 generates the second shaping image 212 for shaping the second shaped portion 12 illustrated in FIG. 8 from the first shaping image 211 for shaping the first shaped portion 11 illustrated in FIG. 6. Furthermore, the control unit 31 generates the second coloring image 222 for coloring the second shaped portion 12 illustrated in FIG. 9 from the first coloring image 221 for coloring the first shaped portion 11 illustrated in FIG. 7. Moreover, the control unit 31 generates the data of the shaping images 211 and 212 and the data of the coloring images 221 and 222 as the printing data to be printed by the printing device 40. In steps S4 to S5, the control unit 31 functions as the generator 312.

When the printing data is generated, the control unit 31 outputs the generated printing data to the printing device 40 (step S6). Specifically, the control unit 31 communicates with the printing device 40 via the communication unit 36, and outputs the generated printing data together with the printing control data to the printing device 40. In step S6, the control unit 31 functions as the outputter 313.

In contrast, when the shaping of the deteriorated three-dimensional shape has not been designated in step S2 (step S2; NO), the control unit 31 does not need to generate the printing data for the deteriorated state of the object and, as such, steps S3 to S5 are skipped. In this case, in step S6, the control unit 31 outputs the data of the first shaping image 211 and the first coloring image 221, which was stored in advance in the storage unit 32 as the shaping data 321, to the printing device 40 as the printing data. Thus, the printing data generation processing illustrated in FIG. 14 is ended.

Next, a description will be given of the flow of the shaping processing executed in the printing device 40 and the expansion device 50 while referencing the flowchart illustrated in FIG. 15 and the cross-sectional views of the thermally expandable sheet 100 illustrated in FIGS. 16A to 16E.

Figure 16A:
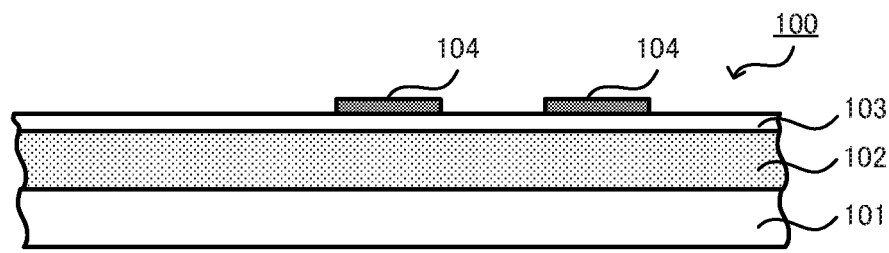
FIGS. 16A to 16E are drawings illustrating, in steps, the shaping of a shaped object on the thermally expandable sheet illustrated in FIG. 1.

First, the user prepares a thermally expandable sheet 100 in which shaped objects have not been shaped. Then, the user inserts the thermally expandable sheet 100 into the printing device 40 with the front side facing upward. The printing device 40 prints a conversion layer 104 on the front side of the inserted thermally expandable sheet 100 (step S11). The conversion layer 104 is a layer that is formed by a material that converts electromagnetic waves to heat, namely carbon black-containing black ink. The printing device 40 discharges the carbon black-containing black ink onto the front side of the thermally expandable sheet 100 in accordance with the data (front side foaming data) of the shaping images 211 and 212 to be printed on the front side of the thermally expandable sheet 100 among the printing data output from the terminal device 30. As a result, the conversion layer 104 is formed on the ink receiving layer 103, as illustrated in FIG. 16A.

Figure 16B:
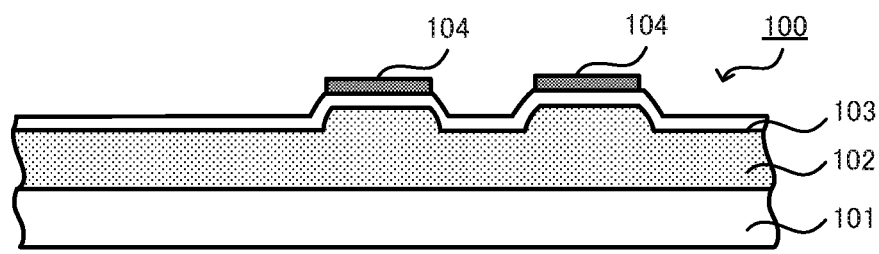

Second, the user inserts the thermally expandable sheet 100 onto which the conversion layer 104 has been printed into the expansion device 50 with the front side facing upward. The expansion device 50 irradiates the front side of the inserted thermally expandable sheet 100 with electromagnetic waves using the irradiator 60 (step S12). The conversion layer 104 printed on the front side of the thermally expandable sheet 100 absorbs the irradiated electromagnetic waves, thereby generating heat. As a result, as illustrated in FIG. 16B, the portions of the thermally expandable sheet 100 where the conversion layer 104 has been printed rise and expand.

Figure 16C:
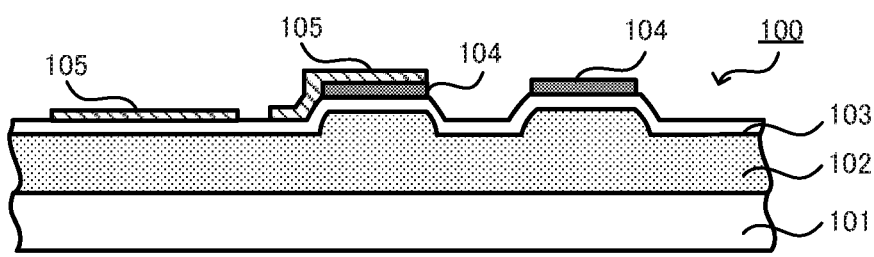

Third, the user inserts the thermally expandable sheet 100, for which the front side has been heated and caused to expand, into the printing device 40 with the front side facing upward. The printing device 40 prints a color ink layer 105 on the front side of the inserted thermally expandable sheet 100 (step S13). Specifically, the printing device 40 discharges at least one color of cyan (C), magenta (M), and yellow (Y) ink onto the front side of the thermally expandable sheet 100 in accordance with the data of the coloring images 221 and 222 among the printing data output from the terminal device 30. As a result, the color ink layer 105 is formed on the ink receiving layer 103 and the conversion layer 104, as illustrated in FIG. 16C.

Note that when printing a black or gray color image in the color ink layer 105, this image is formed by blending the three cyan (C), magenta (M), and yellow (Y) color inks, or is formed by further using a black color ink free of carbon black. As a result, heating of the portion where the color ink layer 105 is formed in the expansion device 50 can be avoided.

Fourth, the user turns over the thermally expandable sheet 100, on which the color ink layer 105 has been printed, and inserts the thermally expandable sheet 100 into the expansion device 50 with the back side facing upward. The expansion device 50 irradiates the back side of the inserted thermally expandable sheet 100 with electromagnetic waves using the irradiator 60, thereby heating the thermally expandable sheet 100 from the back side. As a result, the expansion device 50 causes the solvent included in the color ink layer 105 to volatilize, thereby causing the color ink layer 105 to dry (step S14). Causing the color ink layer 105 to dry facilitates the distension of the thermally expandable sheet 100 in subsequent steps.

Figure 16D:
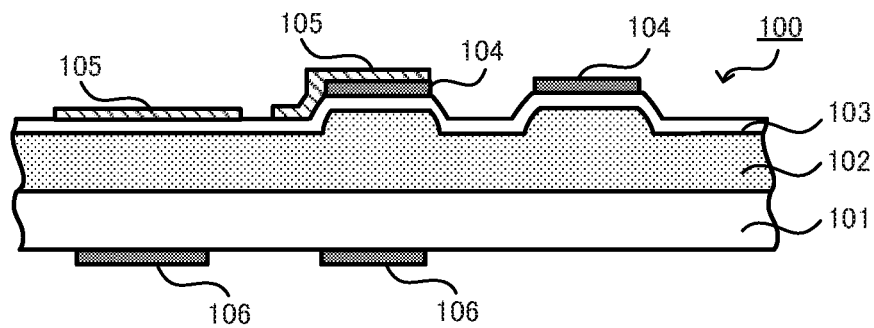

Fifth, the user inserts the thermally expandable sheet 100, onto which the color ink layer 105 has been printed, into the printing device 40 with the back side facing upward. The printing device 40 prints a conversion layer 106 on the back side of the inserted thermally expandable sheet 100 (step S15). Similar to the conversion layer 104 printed on the front side of the thermally expandable sheet 100, the conversion layer 106 is a layer that is formed from a material that converts electromagnetic waves to heat, namely carbon black-containing black ink. The printing device 40 discharges the carbon black-containing black ink onto the back side of the thermally expandable sheet 100 in accordance with the data (back side foaming data) of the shaping images 211 and 212 to be printed on the back side of the thermally expandable sheet 100 among the printing data output from the terminal device 30. As a result, the conversion layer 106 is formed on the back side of the base 101, as illustrated in FIG. 16D.

Figure 16E:
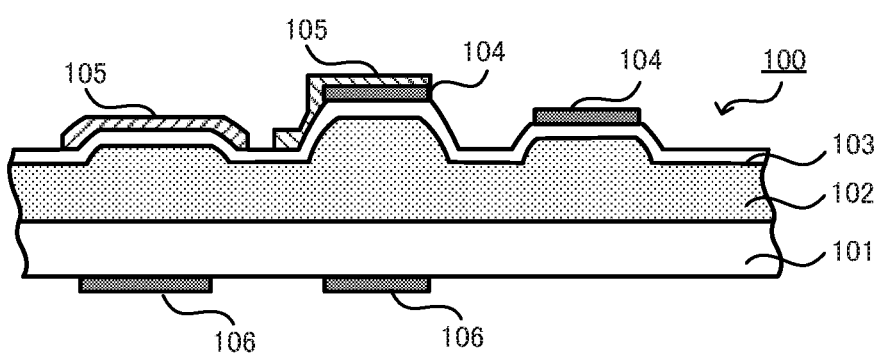

Sixth, the user inserts the thermally expandable sheet 100 onto which the conversion layer 106 has been printed into the expansion device 50 with the back side facing upward. The expansion device 50 irradiates the back side of the inserted thermally expandable sheet 100 with electromagnetic waves using the irradiator 60 (step S16). The conversion layer 106 printed on the back side of the thermally expandable sheet 100 absorbs the irradiated electromagnetic waves, thereby generating heat. As a result, as illustrated in FIG. 16E, the portions of the thermally expandable sheet 100 where the conversion layer 106 has been printed rise and expand.

Note that, in FIGS. 16A to 16E, to facilitate comprehension, the conversion layer 104 and the color ink layer 105 are depicted as being formed on the ink receiving layer 103. However, to be more precise, the color inks and the black ink are absorbed into the ink receiving layer 103 and, as such, the conversion layer 104 and the color ink layer 105 are formed in the ink receiving layer 103.

As described above, a color shaped object is shaped in the thermally expandable sheet 100 as a result of the portions of the thermally expandable sheet 100 where the conversion layers 104 and 106 were formed expanding. Portions of the conversion layers 104 and 106 with greater concentration are heated more and, as such, expand more. Therefore, shaped objects with a variety of shapes can be obtained by adjusting the shades of the conversion layers 104 and 106 according to target heights.

Note that the processing to heat the thermally expandable sheet 100 from the front side or the processing to heat the thermally expandable sheet 100 from the back side may be omitted. For example, when only heating and causing the front side of the thermally expandable sheet 100 to expand, steps S15 and S16 in FIG. 15 are omitted. In contrast, when only heating and causing the back side of the thermally expandable sheet 100 to expand, steps S11 and S12 in FIG. 15 are omitted. Additionally, the printing of the color image in step S13 may be executed after the processing to heat the thermally expandable sheet 100 from the back side of step S16.

Additionally, when manufacturing a monochrome shaped object, the printing device 40 may print a monochrome image instead of a color image in step S13. In this case, instead of the color ink layer 105, a black ink layer is formed on the ink receiving layer 103 and the conversion layer 104.

As described above, the shaping system 1 according to Embodiment 1 estimates the deterioration state of the object, prints the two shaping images 211 and 212 that respectively correspond to the non-deteriorated state and the deteriorated state of the object on the thermally expandable sheet 100, and causes the thermally expandable sheet 100 to expand according to the two shaping images 211 and 212. As a result, the shaping system 1 shapes the two shaped portions 11 and 12 that simulatively express the appearance of the object when non-deteriorated and when deteriorated. Thus, by shaping the three-dimensional shapes, the shaping system 1 according to Embodiment 1 can express the manner in which the object deteriorates in a form more similar to the actual object and in a more comprehensible manner than when only performing simulations in a computer, for example.

Additionally, the shaping system 1 according to Embodiment 1 shapes the shaped portions 11 and 12 by estimating the deteriorated state of the object according to the designations of the environment and the elapsed time received from the user. As such, the user can change the various conditions to estimate the manner in which the object will deteriorate.

Embodiment 2

Next, Embodiment 2 of the present disclosure will be described. In Embodiment 2, descriptions of configurations that are the same as described in Embodiment 1 are forgone.

With the shaped object 10 according to Embodiment 1 described above, the first shaped portion 11 and the second shaped portion 12 are respectively shaped in the first thermally expansive section 21 and the second thermally expansive section 22, which are different sections of a single thermally expandable sheet 100. In contrast, with a shaped object 20 according to Embodiment 2, the first shaped portion 11 and the second shaped portion 12 are respectively shaped in two different thermally expandable sheets 100a and 100b.

Figure 17:
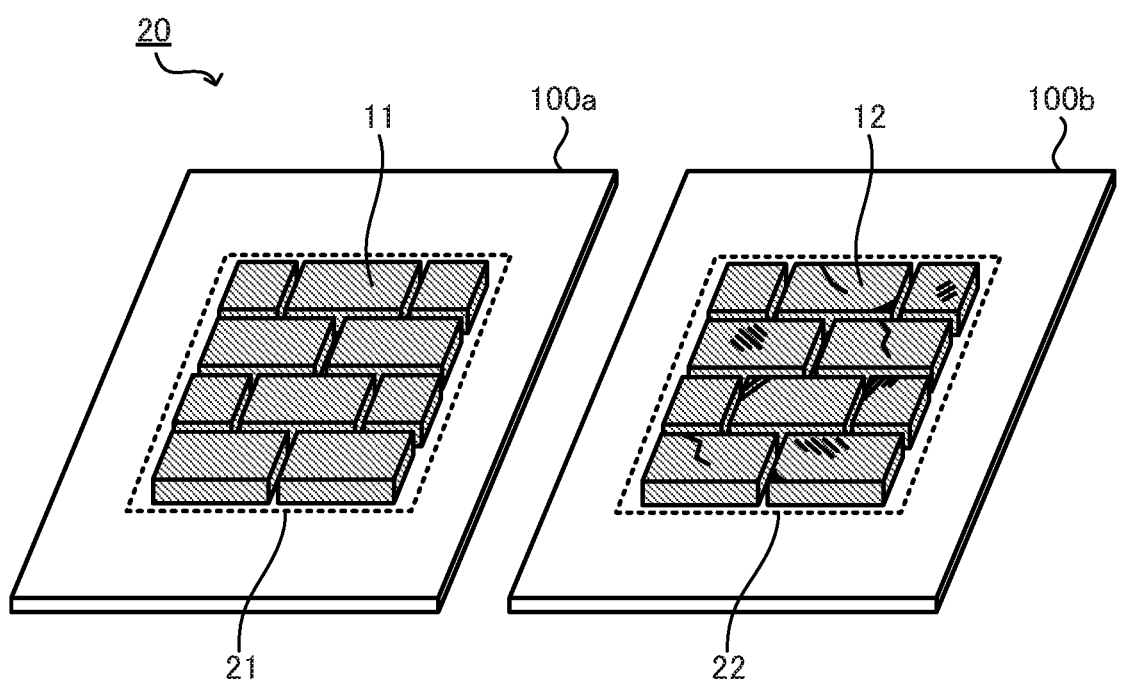
FIG. 17 is a drawing illustrating an example of a shaped object according to Embodiment 2 of the present disclosure.

FIG. 17 illustrates the shaped object 20 according to Embodiment 2. As illustrated in FIG. 17, the shaped object 20 includes the first shaped portion 11 shaped in the first thermally expansive section 21, which is at least a portion of the first thermally expandable sheet 100a, and the second shaped portion 12 shaped in the second thermally expansive section 22, which is at least a portion of the second thermally expandable sheet 100b. The thermally expandable sheet 100a and the thermally expandable sheet 100b are sheets provided with the same configuration as the thermally expandable sheet 100 of Embodiment 1.

Other than the first shaped portion 11 and the second shaped portion 12 being respectively shaped in the separate thermally expandable sheets 100a and 100b, the configuration of the shaped object 20 is the same as that of the shaped object 10 described in Embodiment 1. Specifically, in order to express the differences in the three-dimensional shape between new and old states of the object, the heights of the bumps on the surface of the second thermally expansive section 22 differs from the heights of the bumps on the surface of the first thermally expansive section 21 in at least one portion thereof. In order to express the differences in appearance between new and old states of the object, the color of the second shaped portion 12 differs from the color of the first shaped portion 11 in at least one portion thereof.

Thus, the shaped object 20 according to Embodiment 2 simulatively expresses the appearance of the object when new and old by the color and the bumps on the surfaces of the two thermally expansive sections 21 and 22. The user can easily ascertain the manner in which the object deteriorates by comparing the two shaped portions 11 and 12 shaped in the two thermally expandable sheets 100a and 100b.

The configuration of the shaping system 1 that shapes the shaped object 20 according to Embodiment 2 is the same as that described in Embodiment 1. However, for the shaping processing of the shaped object 20, in Embodiment 1, the first shaped portion 11 and the second shaped portion 12 can be simultaneously shaped in the thermally expandable sheet 100. In contrast, in Embodiment 2, the processing to shape the first shaped portion 11 in the first thermally expandable sheet 100a and the processing to shape the second shaped portion 12 in the second thermally expandable sheet 100b are executed separately.

Specifically, when the first thermally expandable sheet 100a is inserted, the printing device 40 prints the first shaping image 211 or the first coloring image 221 on the first thermally expandable sheet 100a. Thereafter, when the second thermally expandable sheet 100b is inserted, the printing device 40 prints the second shaping image 212 or the second coloring image 222 on the second thermally expandable sheet 100b. Additionally, in the expansion device 50, when the first thermally expandable sheet 100a on which the first shaping image 211 has been printed is inserted, the controller 70 irradiates the first thermally expandable sheet 100a with electromagnetic waves, thereby causing the first thermally expansive section 21 to expand and, as a result, shape the first shaped portion 11. Thereafter, when the second thermally expandable sheet 100b on which the second shaping image 212 has been printed is inserted, the controller 70 irradiates the second thermally expandable sheet 100b with electromagnetic waves, thereby causing the second thermally expansive section 22 to expand and, as a result, shape the second shaped portion 12. Thus, the shaped object 20 is obtained in which the shaped portions 11 and 12 are shaped in the different thermally expandable sheets 100a and 100b.

Alternatively, the shaped object 20 can be obtained by shaping the two shaped portions 11 and 12 in a single thermally expandable sheet 100 and, thereafter, cutting the thermally expandable sheet 100 between the two shaped portions 11 and 12.

Thus, the shaping system 1 according to Embodiment 2 produces the shaped object 20 in which the first shaped portion 11 and the second shaped portion 12 are shaped in separate thermally expandable sheets 100a and 100b. Portability is improved compared to a case in which the two shaped portions 11 and 12 are shaped in the single thermally expandable sheet 100 and, since it is possible to perform a comparison while freely moving the two shaped portions 11 and 12, the user can more easily ascertain the manner in which the object deteriorates.

Modified Examples

Embodiments of the present disclosure are described above, but these embodiments are merely examples and do not limit the scope of application of the present disclosure. That is, various applications of the embodiments of the present disclosure are possible, and all embodiments are included in the scope of the present disclosure.

For example, in the embodiments described above, an example was described in which the outer wall material of a building (bricks) was the object to be expressed by the three-dimensional shapes of the shaped objects 10 and 20. However, in the present disclosure, the object is not limited thereto. The shaped object 10 according to the present disclosure can be applied to a variety of tangible objects such as furniture, daily necessities, foods, and electric/electronic devices, and can express the states of deterioration thereof. Additionally, the object may be the skin of a human or an animal. In this case, the shaped object 10 may express, as the deterioration of the object, the manner in which the skin ages, such as the development of wrinkles or the like. By expressing this state of aging, the present disclosure can be applied to advertising demonstrating anti-aging effects or the like.

In the embodiments described above, the shaped objects 10 and 20 express the non-deteriorated state and the deteriorated state of the object by the two shaped portions 11 and 12. However, in the present disclosure, the shaped objects 10 and 20 may include three or more shaped portions. In this case, by configuring three or more thermally expansive sections, in which the three or more shaped portions are shaped, so as to have mutually different color or heights of the bumps on the surface, the three of more shaped portions can be configured to express mutually different deterioration states. Furthermore, when the three or more shaped portions are shaped in a single thermally expandable sheet 100, the three or more shaped portions may by arranged such that the degree of deterioration increases or decreases in the order in which the shaped portions are laid out.

In the embodiments described above, the barcodes B are provided on the thermally expandable sheets 100, 100a, and 100b. However, instead of the barcodes B, characters, symbols, shapes, or the like may be provided as identifiers on the thermally expandable sheets 100, 100a, and 100b, provided that these identifiers are information that is readable by the reading means.

In the embodiments described above, the thermally expandable sheets 100, 100a, and 100b include the base 101, the thermally expansive layer 102, and the ink receiving layer 103. However, in the present disclosure, the structures of the thermally expandable sheets 100, 100a, and 100b are not limited thereto. For example, configurations are possible in which the thermally expandable sheets 100, 100a, and 100b do not include the ink receiving layer 103, or include a peelable release layer on the front side or the back side. Alternatively, the thermally expandable sheets 100, 100a, and 100b may include a layer made from any other desired material.

In the embodiments described above, the terminal device 30, the printing device 40, and the expansion device 50 are independent devices. However, in the present disclosure, any two, or more, of the terminal device 30, the printing device 40, and the expansion device 50 may be integrated.

In the embodiments described above, the terminal device 30 includes the generator 312 that generates the printing data. However, in the present disclosure, the functions of the generator 312 may be included in a server that is disposed remotely and that is connected to the terminal device 30 and the printing device 40 across an internet or similar broadband network. In one example, the server provides cloud computing resources. In this case, the terminal device 30 sends, to the server, the designations of the environment and the elapsed time received from the user by the receiving means, and receives, from the server, the printing data generated by the server. The shaping data 321 and the simulation data 322 are stored in a storage unit of the server, and the server estimates the deterioration state of the object by simulation according to the designations of the environment and the elapsed time received from the terminal device 30. Then, the server generates the second shaping image 212 and the second coloring image 222 on the basis of the results of the simulation, and sends the printing data that includes the generated image data to the terminal device 30 or the printing device 40.

In the embodiments described above, the expansion device 50 includes the transportation motor 55 as the moving means that moves the irradiator 60, and causes the thermally expandable sheets 100, 100a, and 100b to expand by a method in which the irradiator 60 moves while irradiating electromagnetic waves on the positionally fixed thermally expandable sheets 100, 100a, and 100b. However, a configuration is possible in which the expansion device 50 includes a transportation mechanism that transports the thermally expandable sheets 100, 100a, and 100b, and the thermally expandable sheets 100, 100a, and 100b are caused to expand by a method in which the positionally fixed irradiator 60 irradiates electromagnetic waves on the thermally expandable sheets 100, 100a, and 100b that are being moved. Thus, provided that the expansion device 50 can move the thermally expandable sheets 100, 100a, and 100b and the irradiator 60 relative to each other, any method may be used to cause the thermally expandable sheets 100, 100a, and 100b to expand.

The printing method of the printing device 40 is not limited to ink jet printing. For example, the printing device 40 may by a laser printer that prints images using toner and developer. Additionally, provided that the conversion layers 104 and 106 are formed from materials that easily convert electromagnetic waves to heat, the conversion layers 104 and 106 may be formed from materials other than the carbon black-containing black ink. In this case, the conversion layers 104 and 106 may be formed by means other than the printing device 40.

In the embodiments described above, the control unit 31 of the terminal device 30 includes a CPU which, by the functions of the CPU, functions as the receiver 311, the generator 312, and the outputter 313. However, in the terminal device 30 according to the present disclosure, the control unit 31 may include, for example, an Application Specific Integrated Circuit (ASIC), a Field-Programmable Gate Array (FPGA), various control circuitry, or other dedicated hardware instead of the CPU, and this dedicated hardware may function as the receiver 311, the generator 312, and the outputter 313. In this case, the various processing may be executed by individual pieces of hardware, or the various processing may be collectively executed by a single piece of hardware. Additionally, the various processing may be executed in part by dedicated hardware and in part by software or firmware.

It is possible to provide a shaping system 1 provided in advance with the configurations for realizing the functions according to the present disclosure, but it is also possible to apply a program to realize the various functional components of the shaping system 1, described in the foregoing embodiments, by a computer that controls the shaping system 1. That is, a configuration is possible in which a CPU or the like that controls an existing information processing apparatus or the like is used to execute a program for realizing the various functional components of the shaping system 1 described in the foregoing embodiments.

Any method may be used to apply the program. For example, the program can be stored on a computer-readable storage medium such as a flexible disk, a CD-ROM, a DVD-ROM, a memory card, or the like and applied. Furthermore, the program can be superimposed on a carrier wave and applied via a communication medium such as the internet. For example, the program may be posted to and distributed via a bulletin board system (BBS) on a communication network. Moreover, a configuration is possible in which the processing described above is executed by starting the program and, under the control of the operating system (OS), executing the program in the same manner as other applications/programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A system comprising:
a computer;
a printer; and
a light source,
wherein the computer is configured to:
   access first shaping image data comprising:
      information on a first conversion layer of a conversion material to be formed on a thermally expandable sheet, wherein the conversion material is configured to convert electromagnetic waves to heat; and
      information on a first density of the conversion material in a portion of the first conversion layer, wherein the first density of the conversion material in the portion of the first conversion layer corresponds to a first amount of heat converted from the electromagnetic waves to distend a portion of the thermally expandable sheet on which the first conversion layer is formed to a first height;
   receive simulation data;
   change the first shaping image data based on the simulation data to generate second shaping image data comprising:
      information on a second conversion layer of the conversion material to be formed on the thermally expandable sheet; and
      information on a second density of the conversion material in a portion of the second conversion layer corresponding to the portion of the first conversion layer,
      wherein the second density of the conversion material in the portion of the second conversion layer is determined based on the simulation data, and
      wherein the second density of the conversion material in the portion of the second conversion layer corresponds to a second amount of heat, less than the first amount of heat, converted from the electromagnetic waves to distend a portion of the thermally expandable sheet on which the second conversion layer is formed to a second height less than the first height;
   control the printer to form the second conversion layer on the thermally expandable sheet based on the second shaping image data; and
   control the light source to irradiate the second conversion layer.

2. The system according to claim 1,
wherein the computer is configured to:
   access first color image data comprising information on a first color ink layer to be formed on the portion of the thermally expandable sheet distended by the first amount of heat converted from the electromagnetic waves by the portion of the first conversion layer;
   change the first color image data based on the simulation data to generate second color image data comprising information on a second color ink layer to be formed on the portion of the thermally expandable sheet distended by the second amount of heat converted from the electromagnetic waves by the portion of the second conversion layer; and
control the printer to form the second color ink layer on the thermally expandable sheet based on the second color image data.

3. The system according to claim 1,
wherein the computer is configured to:
   control the printer to form the first conversion layer on the thermally expandable sheet based on the first shaping image data; and
   control the light source to irradiate the first conversion layer.

4. The system according to claim 3,
wherein the computer is configured to control the printer to form the first conversion layer and the second conversion layer to have identical planar sizes.

5. The system according to claim 1,
wherein the computer is configured to control the printer to form the second conversion layer on the thermally expandable sheet as a gray-scale image.

6. A method comprising:
accessing first shaping image data comprising:
   information on a first conversion layer of a conversion material to be formed on a thermally expandable sheet, wherein the conversion material is configured to convert electromagnetic waves to heat; and
   information on a first density of the conversion material in a portion of the first conversion layer,
   wherein the first density of the conversion material in the portion of the first conversion layer corresponds to a first amount of heat converted from the electromagnetic waves to distend a portion of the thermally expandable sheet on which the first conversion layer is formed to a first height;
receiving simulation data;
changing the first shaping image data based on the simulation data to generate second shaping image data comprising:
   information on a second conversion layer of the conversion material to be formed on the thermally expandable sheet; and
   information on a second density of the conversion material in a portion of the second conversion layer corresponding to the portion of the first conversion layer,
   wherein the second density of the conversion material in the portion of the second conversion layer is determined based on the simulation data, and
   wherein the second density of the conversion material in the portion of the second conversion layer corresponds to a second amount of heat, less than the first amount of heat, converted from the electromagnetic waves to distend a portion of the thermally expandable sheet on which the second conversion layer is formed to a second height less than the first height;
forming the second conversion layer on the thermally expandable sheet based on the second shaping image data; and
irradiating the second conversion layer.

7. The method according to claim 6, further comprising:
accessing first color image data comprising information on a first color ink layer to be formed on the portion of the thermally expandable sheet distended by the first amount of heat converted from the electromagnetic waves by the portion of the first conversion layer;
changing the first color image data based on the simulation data to generate second color image data comprising information on a second color ink layer to be formed on the portion of the thermally expandable sheet distended by the second amount of heat converted from the electromagnetic waves by the portion of the second conversion layer; and forming the second color ink layer on the thermally expandable sheet based on the second color image data.

8. The method according to claim 6, further comprising:
forming the first conversion layer on the thermally expandable sheet based on the first shaping image data; and
irradiating the first conversion layer.

9. The method according to claim 8, further comprising:
forming the first conversion layer and the second conversion layer to have identical planar sizes.

10. The method according to claim 6,
wherein the second conversion layer is formed on the thermally expandable sheet as a gray-scale image.

\* \* \* \* \*